United States Patent
Ubilla

(10) Patent No.: US 11,907,435 B1
(45) Date of Patent: Feb. 20, 2024

(54) TRANSFORMABLE APPARATUS WITH RETRACTABLE DISPLAY

(71) Applicant: Omar Kevin Ubilla, Canoga Park, CA (US)

(72) Inventor: Omar Kevin Ubilla, Canoga Park, CA (US)

(73) Assignee: Omar Kevin Ubilla, Los Gatos, CA (US)

( * ) Notice: Subject to any disclaimer, the term of this patent is extended or adjusted under 35 U.S.C. 154(b) by 0 days.

(21) Appl. No.: 17/879,733

(22) Filed: Aug. 2, 2022

Related U.S. Application Data

(60) Provisional application No. 63/228,277, filed on Aug. 2, 2021.

(51) Int. Cl.
| | |
|---|---|
| *G02B 27/01* | (2006.01) |
| *G06F 3/01* | (2006.01) |
| *G10L 15/22* | (2006.01) |
| *G06V 40/20* | (2022.01) |

(52) U.S. Cl.
CPC ......... *G06F 3/017* (2013.01); *G02B 27/0176* (2013.01); *G06V 40/28* (2022.01); *G10L 15/22* (2013.01); *G10L 2015/223* (2013.01)

(58) Field of Classification Search
CPC .............. G02B 27/017; G02B 27/0172; G02B 27/0176; G02B 2027/0138; G06F 3/017
See application file for complete search history.

(56) References Cited

U.S. PATENT DOCUMENTS

| | | | |
|---|---|---|---|
| 5,414,436 A | 5/1995 | Shinkawa | |
| 8,310,322 B2 * | 11/2012 | Tomimbang | H01H 50/60 |
| | | | 200/17 R |
| 9,195,067 B1 | 11/2015 | Heinrich | |
| 9,525,936 B1 * | 12/2016 | Dong | H04B 1/385 |
| 9,978,118 B1 * | 5/2018 | Ozguner | G03H 1/0841 |
| 10,126,553 B2 | 11/2018 | Poulos | |
| 10,408,313 B1 * | 9/2019 | Sullivan | F16H 19/06 |
| 2005/0017526 A1 | 1/2005 | Arrotta | |

(Continued)

FOREIGN PATENT DOCUMENTS

CN            203901239 U      10/2014

OTHER PUBLICATIONS

U.S. Appl. No. 63/228,277, filed Aug. 2, 2021, Omar K. Ubilla.

*Primary Examiner* — Yuzhen Shen

(57) ABSTRACT

An electronic, transformable apparatus (17) worn on a user's ear is disclosed. The apparatus (17) can either automatically extend or retract a display (18) above the user's eye. The display (18) is supported by an array of telescoping extension tubes (20) which fit inside one another and are housed inside the apparatus along with the display (18) when fully retracted. Upon extrusion of the display (18), the array of telescopic extension tubes (20) are pushed outward via an electronic mechanism including image generating means inside the apparatus. Thus, the apparatus's display (18) is visible when in use, and not visible when not in use. The apparatus (17) receives inputs from the user via a microphone (46) and camera (27), as well as the environment (68) via sensors associated with information about a moment in time. This information is then processed and output to the user either via an audio speaker (32), via presentation on the display (18), both simultaneously, or either of the two alone.

4 Claims, 18 Drawing Sheets

(56) References Cited

U.S. PATENT DOCUMENTS

| | | |
|---|---|---|
| 2006/0119539 A1 | 6/2006 | Kato |
| 2006/0238838 A1 | 10/2006 | Miyake |
| 2009/0073082 A1* | 3/2009 | Yoshikawa ........ G02B 27/0176 |
| | | 345/8 |
| 2009/0243970 A1* | 10/2009 | Kato ................ G02B 27/0176 |
| | | 345/8 |
| 2015/0167288 A1* | 6/2015 | Harkin .................... B64C 3/40 |
| | | 403/107 |
| 2017/0352184 A1 | 12/2017 | Poulos |
| 2018/0003985 A1* | 1/2018 | Eromaki ............ G02B 27/0176 |
| 2019/0011701 A1* | 1/2019 | Ji ...................... G02B 27/0172 |
| 2019/0238968 A1* | 8/2019 | Hajati .................... H04R 5/033 |
| 2020/0019236 A1* | 1/2020 | Parkinson ............... G06F 3/012 |

\* cited by examiner

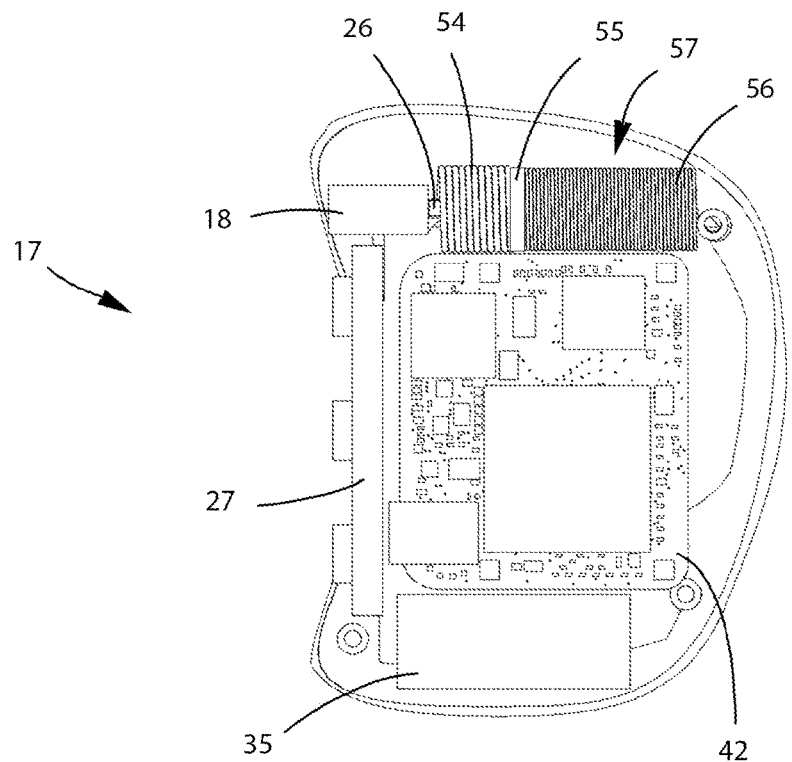
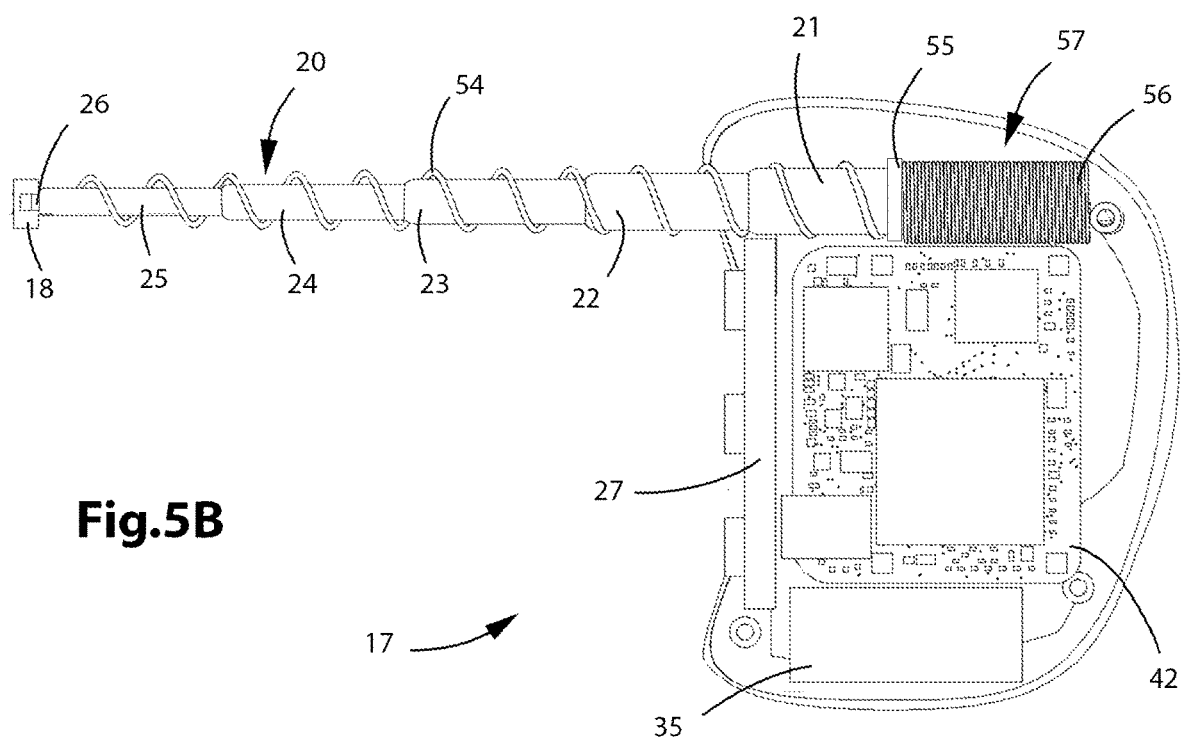

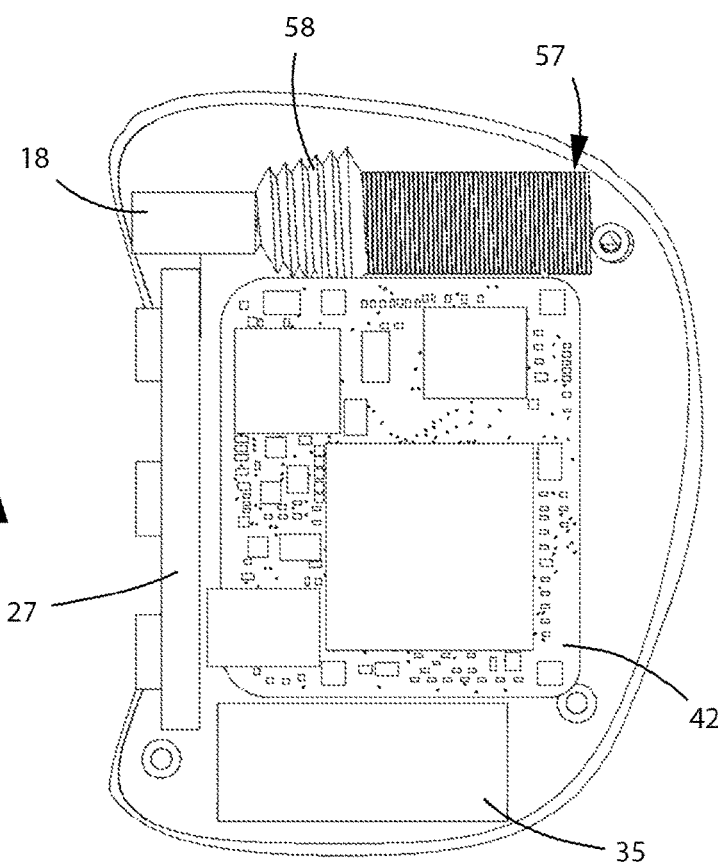
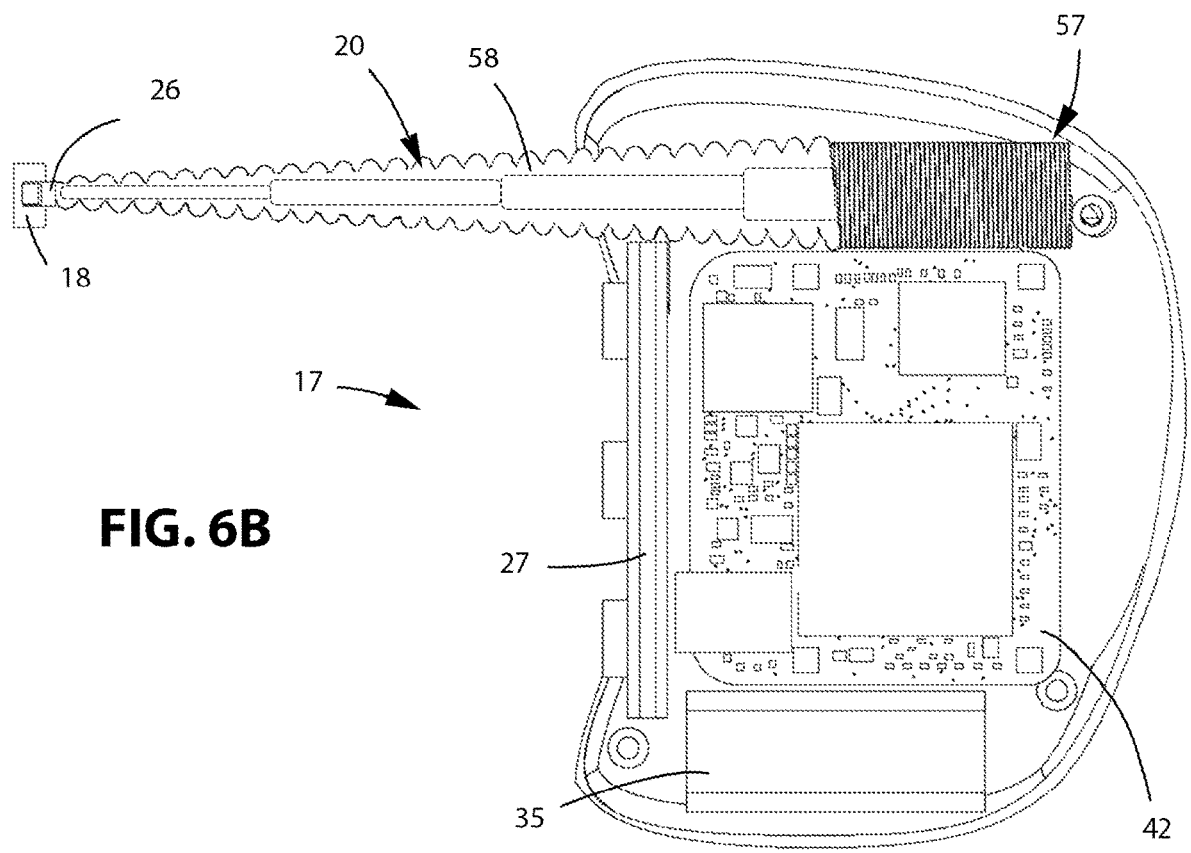

TRANSFORMABLE APPARATUS WITH RETRACTABLE DISPLAY

CROSS REFERENCE TO RELATED APPLICATIONS

This application claims the benefit of U.S. Provisional Patent Application Ser. No. 63/228,277 filed Aug. 2, 2021 by the present inventor.

FEDERALLY SPONSORED RESEARCH none

SEQUENCE LISTING none

TECHNICAL FIELD

The present invention relates to wearable computing devices, and more specifically to the hardware structure of computing devices for augmented and virtual reality.

BACKGROUND

Users of existing smartphone devices must bend their necks at disproportionate angles to operate the device and engage the device's display screen; resulting in permanent damage to the physiology of the user and a loss of situational awareness, which can increase the risk of injury and a loss of both physical and mental control.

While the device is not in use, users are forced to place it in their pants' pockets, purse, backpack, or other surface that can allegedly 'hold' the device such as a countertop or even on the ground. While in use, the user must occupy their hand(s) in order to hold the device up to their ears or eyes, sometimes both, and attempt to block out interfering noise from their surroundings. Doing so results in a loss of mobility primarily due to using their hand(s) to operate the device in addition to their entire eye focus preoccupied on the display screen of the device, which may be 5 inches or larger in length, completely obfuscating their field of vision.

Modern head-mounted devices are supported by either frames that encompass the entire head or frames that use several body parts or various dimensions of a body part for support in order to exhibit a display screen around the user's eye(s).

I have found that existing head mounted devices such as the Microsoft Hololens No. U.S. Ser. No. 10/126,553B2 (2018) are solid-state devices which maintain their form and provide the same functionality to the user at all times. More so, I have found these devices are primarily meant for use at home or in a controlled environment due to the fact that my field of vision is constrained by the enclosed display screen while worn on my face. This means I can operate the head mounted device if my surroundings do not change physical place during operation. Because my physical space does not change, I am able to participate in a virtual or augmented reality provided by the head-mounted device. Furthermore, I have noted that head-mounted devices are incumbent while I am in active motion due to the fact that my complete field of view is limited by the device's shape around my eyes and temple, impairing my reaction time due to blind spots.

Existing monocle-style devices, such as the Google Glass Patent No. U.S. Pat. No. 9,195,067 B1 (2015), are static and their entire shape, including the device, the display screen, and the frames needed to support them, are noticeable at all times. Although the Google Glass can bend and stretch in at least one direction, the purpose of doing so is simply to adjust to the individual head shape and size of the user. Regardless of the degree of change to its physical shape, the entire Google Glass remains visible at all times. I have found that such visibility of the device(s) interferes with my facial composition and becomes undesirable for certain scenarios such as picture taking, running at high speeds, vigorous exercise, embracing, intimate moments, or simply while not in use.

Additionally, other head mounted displays such as Nikon Corp. Patent No. US20060119539A1 are built to move a display from a position that is in front of the eye to a position that is not in front of the eye in order to prevent unsightliness. The wearer accomplishes this by manually grabbing the display with their fingers and using their entire arm's physical force to move the display into a position not in front of their eye. I find this method tedious as I must physically touch the display in order to move it, and might be unwilling to do so if my hands are dirty, wet, or otherwise occupied.

Moreso, I have found that in certain automobile radio antennas, specifically the Electric Extensible Car Antenna Patent No. U.S. Pat. No. 5,414,436A; the word 'automatic' as used in this patent refers to an automated mechanism that is actuated via a single specific signal; the car radio. I have found that once the user manually turns on the radio by pressing or turning a button, the car antenna automatically begins to fully extend and upon the user manually turning off the radio, the car antenna retracts entirely. I have noted that the use of such mechanisms are a good fit for engaging a radio's antenna because the radio can only be either on or off, thus only one signal must be received to perform the mechanism.

Furthermore, telescoping electromagnets such as the Pen-sized Telescoping Electromagnet Patent No. U.S. 20050017526A1 (2003) must be actuated manually and are mainly intended for retrieving screws, metal knuts, and other metal pieces. Likewise, existing solenoids such as the Solenoid Actuator Patent No. U.S. Pat. No. 8,310,322B2 (2012) are mainly used as push-pull type solenoids. These solenoids contain a rod or tube inside that may cross the entire length of the solenoid. In these types of solenoids, I have noted that when actuated via an electric current, the solenoids pull in one direction and push in another, or vise-versa. I have found that these and other types of solenoids are mainly used for linear actuator mechanisms.

SUMMARY

In accordance with aspects of one or more embodiments, a transformable apparatus that provides a retractable, on-demand display screen to interface with the apparatus is disclosed. The primary purpose of the apparatus is to provide a display that is visible when in use, and not visible while the display is not in use. Respectively, the advantages of a transformable apparatus with both conspicuous and inconspicuous modes of operation are as follows: to provide an ergonomic apparatus that allows users to maintain appropriate neck and body posture during operation, to provide a display to interface with the apparatus while simultaneously allowing the user to maintain an active presence in the real world, allow the user to interface with and control the apparatus using both speech and hand gestures, grant the user the ability to automatically extract the display while in use and retract the display while not in use, and to shapeshift according to the user's adjustment preferences and operational needs. Other advantages of one or more aspects will become noted from the drawings and subsequent detailed description. In order to accomplish its purpose, the embodiments utilize a modifiable structure for a transformable apparatus described in the following sections.

This summary does not intend to provide a complete description of the subject matter or identify any fundamental feature, nor limit the scope of the claimed subject matter in any way.

BRIEF DESCRIPTION OF THE DRAWINGS

FIG. 5A-B illustrates a third embodiment's internal mechanism with the array of telescoping extension tubes extracted and retracted.

FIG. 6A-B shows the third embodiment's internal mechanism with the array of telescoping extension tubes covered by a protective sleeve when extracted and retracted.

| REFERENCE PART NO.: |
| --- |
| 14 apparatus addition |
| 15 user A |
| 16 user B |
| 17 apparatus |
| 18 display |
| 19 right ear |
| 20 array of extension tubes |
| 21 extension tube housing |
| 22 large extension tube |
| 23 medium extension tube |
| 24 small extension tube |
| 25 extra small extension tube |
| 26 swivel |
| 27 camera |
| 28 power button |

| REFERENCE PART NO.: |
| --- |
| 29 earbud |
| 30 ear frame |
| 31 flexible fabric |
| 32 speaker |
| 33 charge port |
| 34 motor |
| 35 battery |
| 36 small gear |
| 37 large gear |
| 38 drive cable |
| 39 protective layer |
| 40 drive cable housing |
| 41 motion sensor |
| 42 circuit board |
| 43 central processing unit |
| 44 memory |
| 45 Wifi module |
| 46 microphone |
| 47 flashlight |
| 49 processor units |
| 50 memory |
| 51 speaker |
| 53 worm gear |
| 54 conical spring |
| 55 washer |
| 56 magnetic wire |
| 57 solenoid |
| 58 sleeve cover |
| 59 flexible material |
| 60 geometric plate |
| 61 programmable matter |
| 62 programmable arm |
| 63 apparatus bridge |
| 64 apparatus addition |
| 65 extraction/retraction mechanism |
| 66 transmission network |
| 67 satellite |
| 68 environment |
| 69 external device |
| 70 light-emitting diode |
| 71 interconnected apparatus |
| 72 extend hand gesture |
| 73 close hand gesture |
| 74 wrist-flick gesture |
| 75 voice command |
| 76 open palm gesture |
| 77 focus points |
| 78 hand outline |
| 79 focus box |
| 80 camera to processor input |

DETAILED DESCRIPTION

The present disclosure is not limited to the following embodiments and can naturally be embodied in various different forms within the spirit and scope of the present embodiments. Hence, there are many alternative ways that a transformable apparatus with a retractable display can be implemented. This application claims the benefit of U.S. Provisional Patent Application Ser. No. 63/228,277 filed Aug. 2, 2021

Figure 1A:
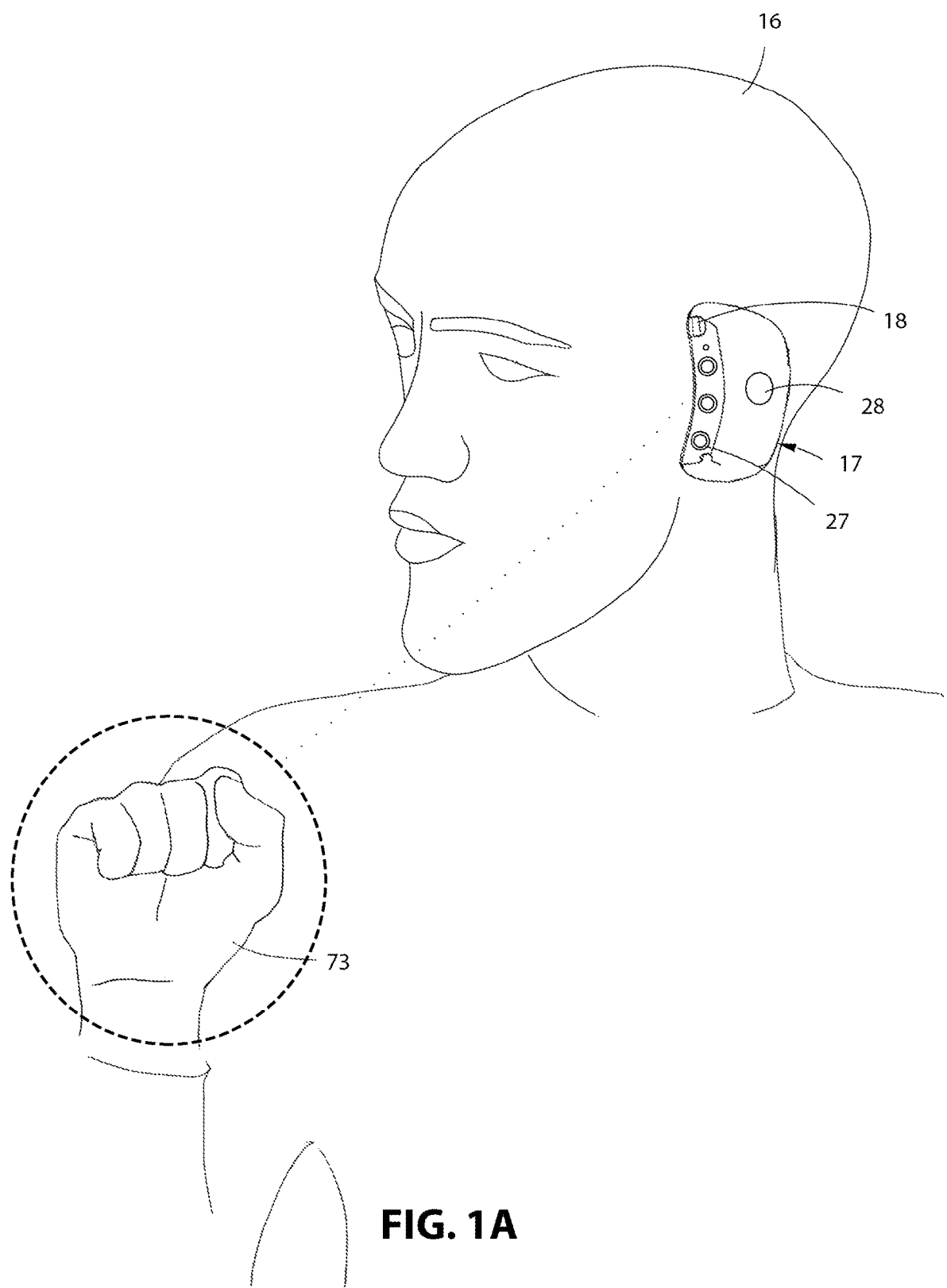
FIG. 1A-B illustrates a first embodiment fully retracted while being worn on a user's left ear and fully extended once the user performs a hand gesture.

FIG. 1A illustrates a first embodiment's fully retracted transformable, shape-shifting apparatus 17 worn on the left ear of a user 16. In this mode, a display 18 remains inconspicuous and fully retracted inside apparatus 17. The apparatus 17 houses the display 18 along with all other parts. Thus, a user 16 operates apparatus 17 via voice control and hand gestures made by the user within the field of view of a camera 27. The apparatus 17 holds the camera 27 that recognizes a user's hand gestures in order to control the extraction and retraction mechanism, as well as navigate through the apparatus's features via hand gesture controlled manipulation of the holographic objects presented on the display 18. The hand gestures detected by the camera 27 may be both air wave gestures that the user creates by waving their hand in midair as well as surface tap gestures made by touching their hand to a physical surface such as a table or wall. In this illustration, user 16 is making a first with their hand which may represent a close gesture 73, thereby instructing the apparatus 17 to remain retracted or begin to retract if currently extracted. The camera 27 has a wide array of tasks including, but not limited to, taking photos, recording video, mapping the environment, and generating processor commands based on the user's air wave and surface tap hand gestures. The apparatus 17 may include a power button 28 which enables users to physically touch their finger to power button 28 in order to manually unlock and turn on and off the apparatus 17, as well as navigate through the apparatus's features. Although in this figure the user 16 wears apparatus 17 on the left ear, an alternative embodiment enables the user 16 to wear apparatus 17 on either ear. In some embodiments, a liquid crystal display (LCD) may encompass parts of apparatus 17 such as the power button 28 and display images, patterns, colors, or a combination thereof.

Figure 1B:
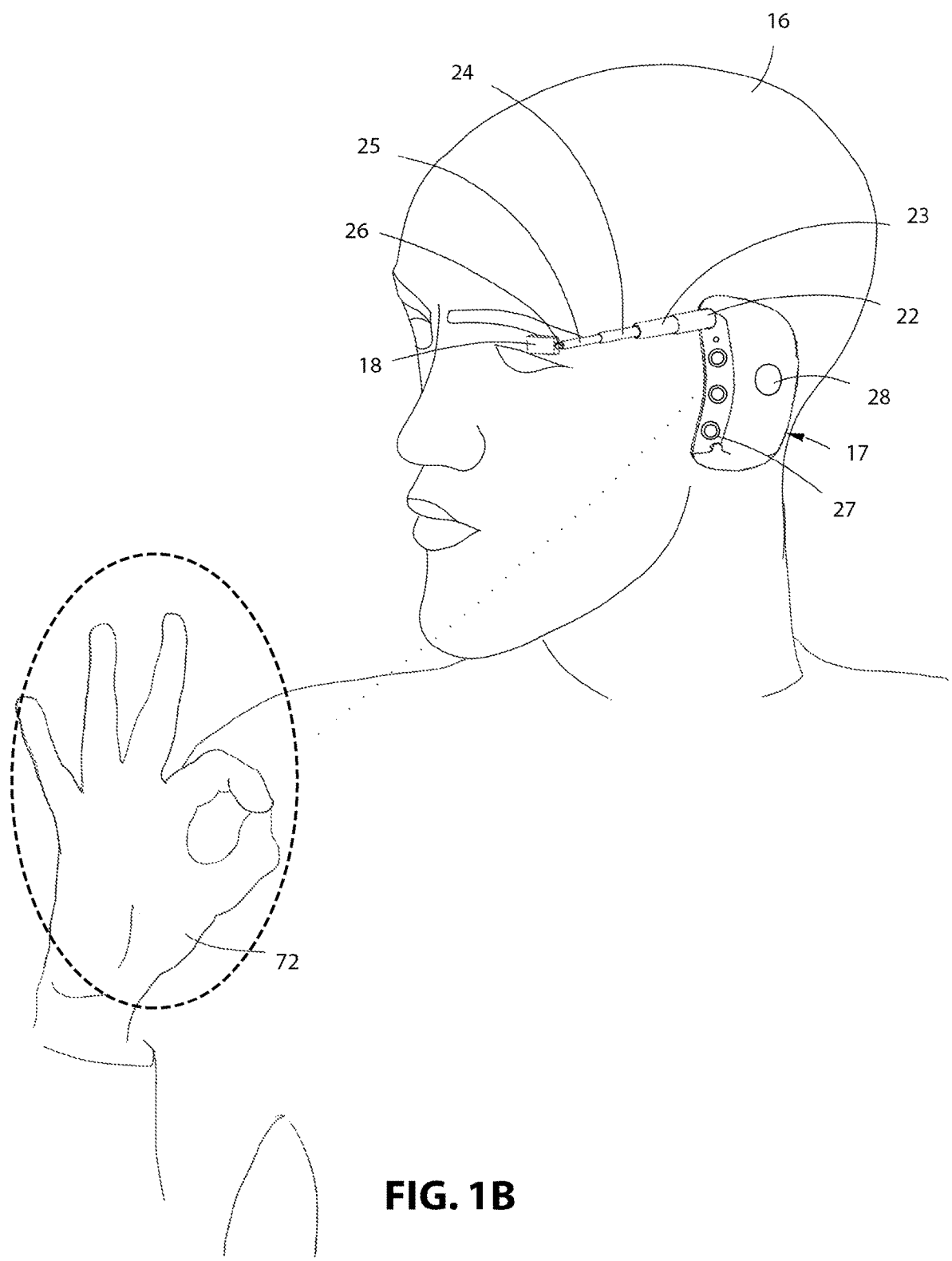

FIG. 1B illustrates a first embodiment's fully extended apparatus 17 worn on the left ear of a user 16. In this mode, the apparatus 17 remains conspicuous and fully extended within the field of view of user 16. In comparison to FIG. 1A, the user has now made an air wave, open hand gesture 72 that commands the apparatus 17 to extract the display 18. Thus, the user 16 controls the extraction of the apparatus 17 via the open hand gesture 72, and further operates the apparatus 17 via navigation of and interaction with holographic objects provided by the display 18. The apparatus 17 houses the camera 27 and telescopic extension tubes 25, 24, 23, and 22, which fit inside one another and may connect to display 18 by means of a swivel 26. Although in this figure the user 16 wears apparatus 17 on the left ear, an alternative embodiment enables the user 16 to wear the apparatus 17 on either ear. While worn on the right ear, the position of the power button 28, along with all the internal mechanics and other components are mirrored to reflect the change in the side of the ear chosen.

In some embodiments; instead of shape-shifting apparatus 17, a uniquely sized machine or apparatus of a different form can accomplish the extraction and retraction mechanism that presents display 18 in any position around the user's eye. Alternative embodiments may also allow users to wear apparatus 17 on either ear by rotating the apparatus housing in order to adjust to the user's left or right ear frame. Moreso, the camera 27 may also include the ability to spatially map complex surfaces, enabling the apparatus 17 to identify and process anything that a user touches physically. The camera 27's field of view is not limited to the front, forward-facing part of the apparatus. Instead, the camera 27's field of view may encompass a 360 degree space in all directions. In order to accomplish this, the apparatus 17 may position various individual camera 27 lenses connected on any side or surface of the apparatus 17.

Figure 2A:
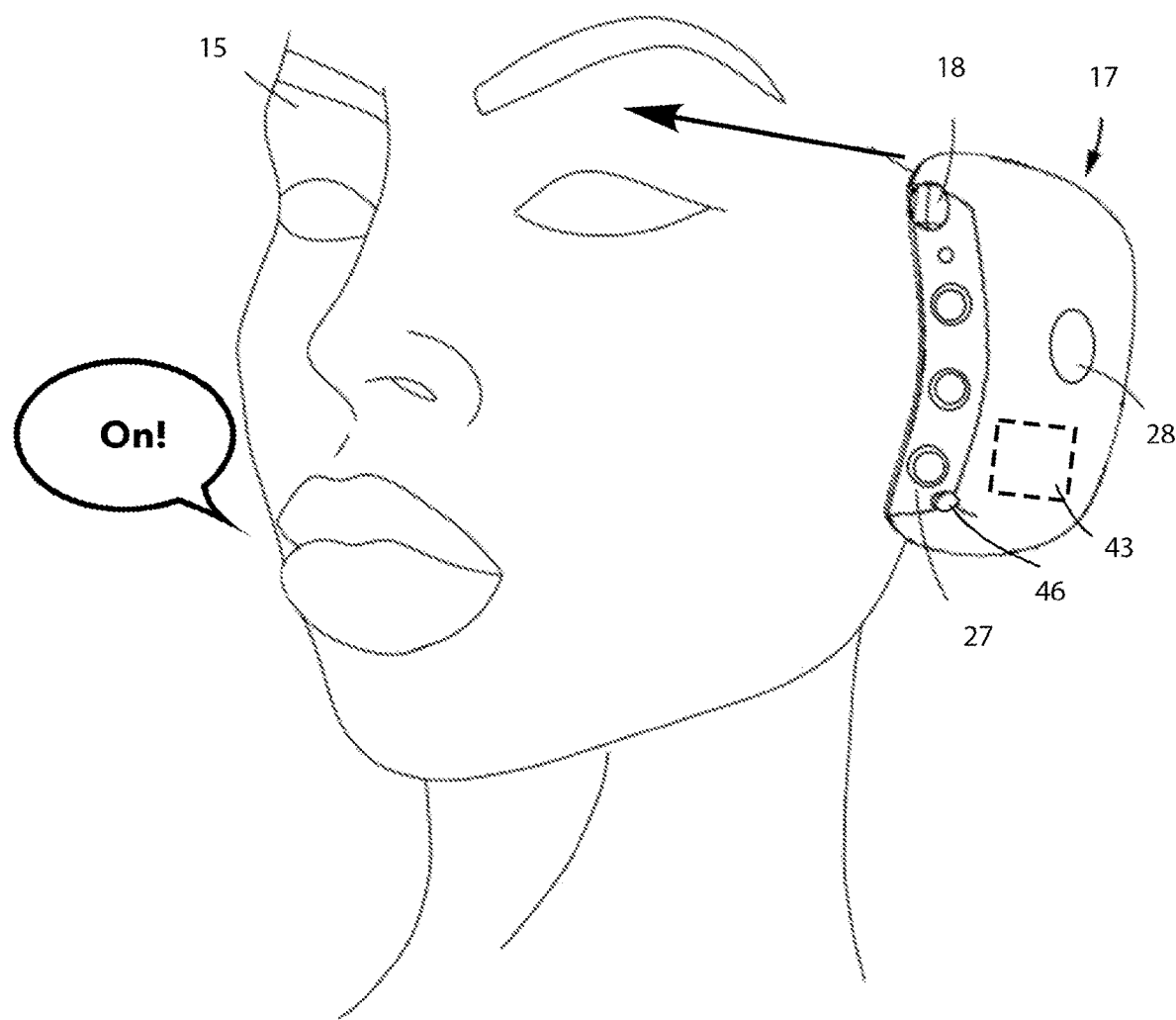
FIG. 2A-B illustrates a first embodiment fully retracted while being worn on a user's left ear and fully extended once the user performs a spoken voice command.

FIG. 2A illustrates the apparatus 17 worn on the left ear of a user 15. In this mode, the display 18 remains inconspicuous and fully retracted inside apparatus 17. The user 15 may continue to operate the apparatus 17 via voice commands, as well as use the apparatus 17 for passive tasks such as listening to music or podcasts. User 15 may also switch music tracks or toggle audio settings via different air wave hand gestures as the camera 27 remains active once worn by the user and can thus recognize the user's hand gestures regardless of whether the display 18 is extracted or retracted. As soon as user 15 issues a voice command 75 such as the word "On", the apparatus 17 uses microphone 46 as an input for the central processor unit 43, both housed inside the apparatus 17, in order to determine the required position of the display and in this case; begin to extend the display 18.

Figure 2B:
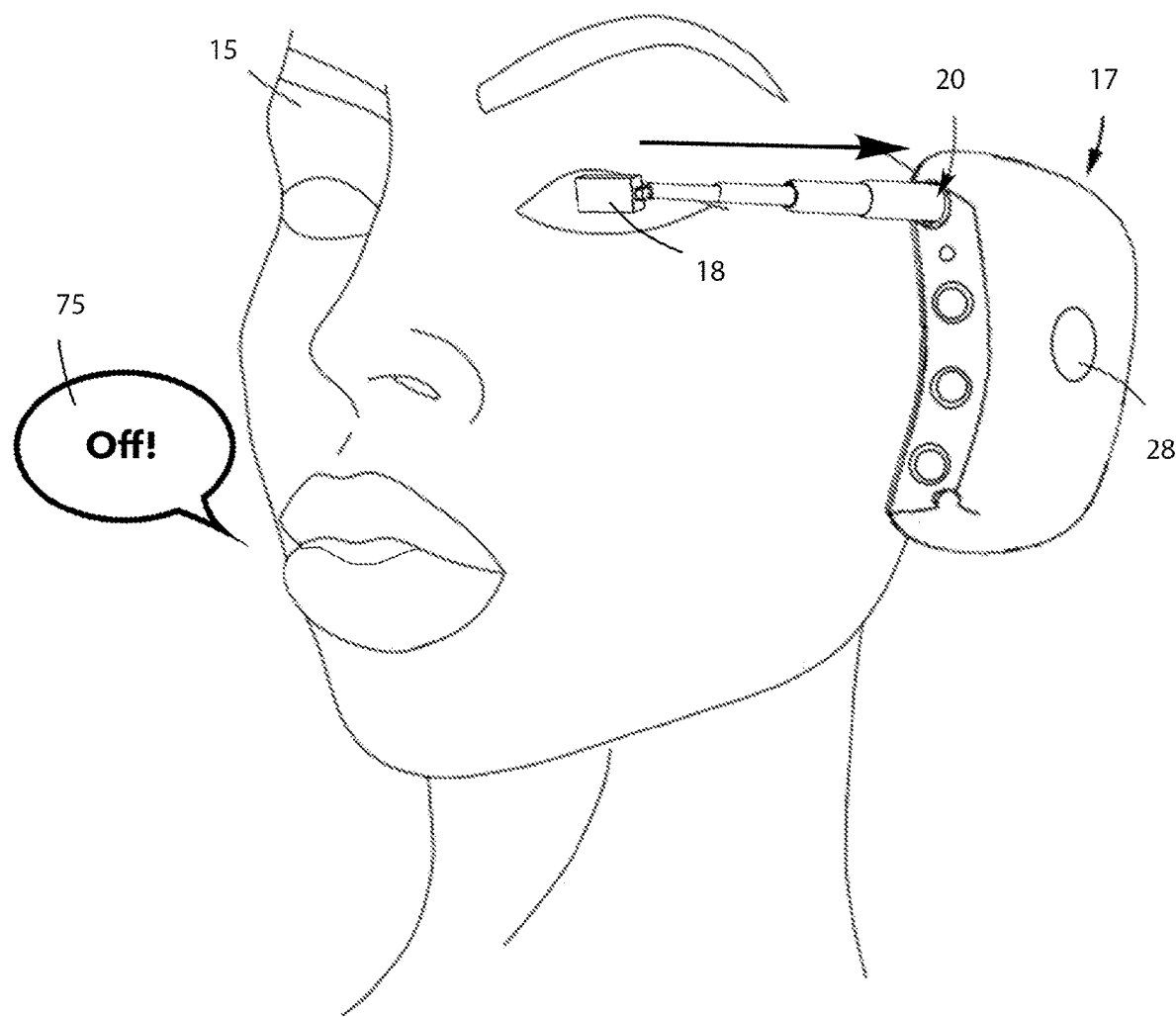

FIG. 2B illustrates the extended apparatus 17 worn on the left ear of a user 15. In this mode, the apparatus 17 remains conspicuous and fully extended within the field of view of user 16. In comparison to FIG. 2A, the user may now make a different voice command 75, such as the word "Off", in order for the apparatus 17 to retract the display 18. This may be achieved by the array of telescoping extension tubes 20 pulling the display 18 inside the apparatus 17. Thus, the user 15 may control the extraction and retraction of the apparatus 17 via a voice command 75, and further operate the apparatus 17 via voice controlled navigation of and interaction with holographic objects provided by the display 18.

In some embodiments, a different voice command 75 may be performed in order to control the extraction and retraction of the display 18. Alternatively, users may create their own voice commands and save them on the device in order for the apparatus 17 to recognize these words and extract or retract the display 18 accordingly. In other embodiments, the apparatus 17 may include a power button 28 that allows a user to manually touch their finger to the button in order to actuate the extraction and retraction mechanism of the display 18.

Figure 3:
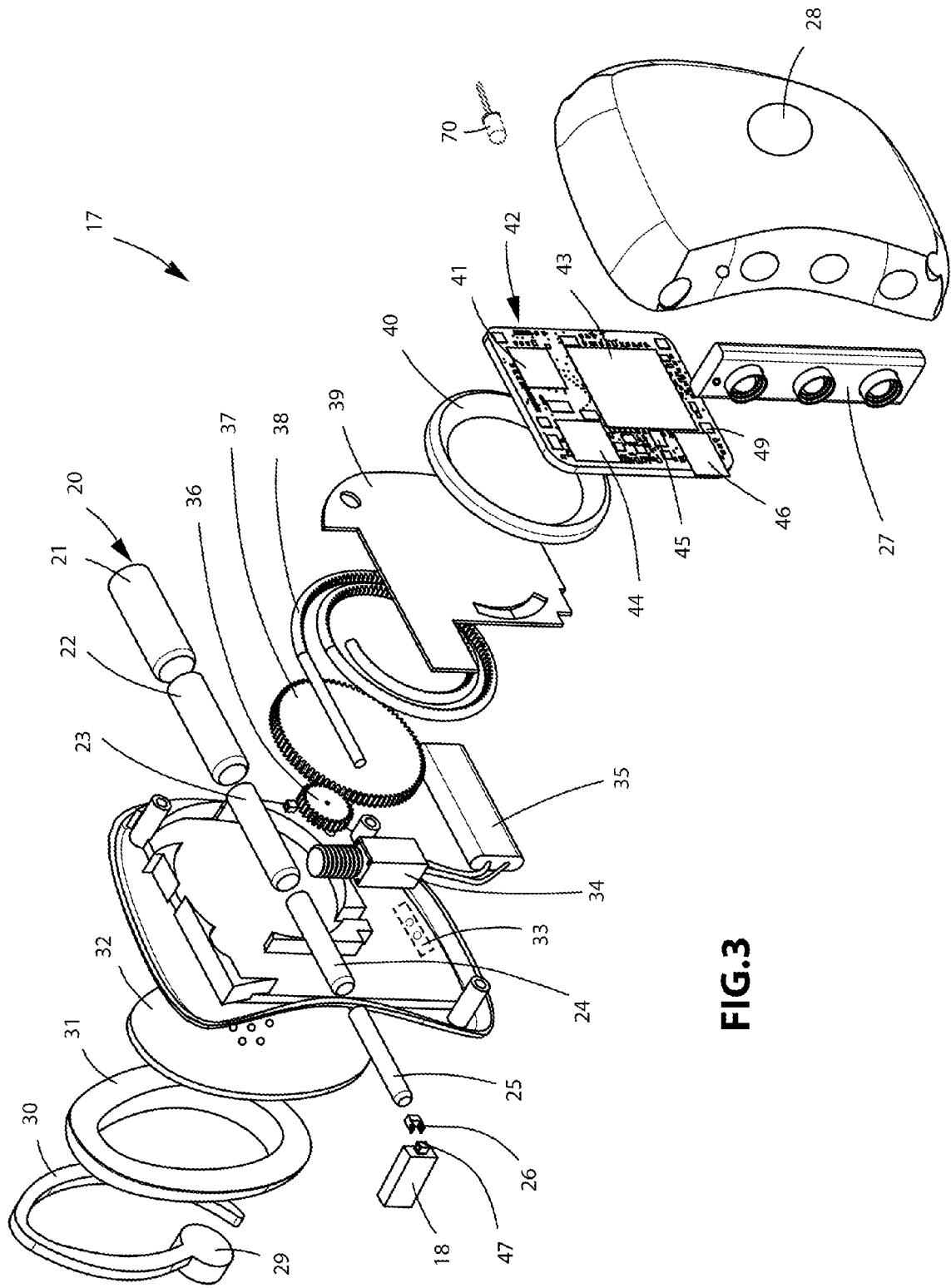
FIG. 3 is an angular, left-side exploded view of a second embodiment.

FIG. 3 is an angular, left-side exploded view of a second embodiment's apparatus 17 that would be worn on a user's left ear and details the apparatus parts in order from left to right. The internal mechanics are the same for an apparatus worn on the right ear, the only difference being the sequence of parts relative to the inner and outer side of the apparatus 17, with the inner side defined as the side closest to the ear. The apparatus 17 has external components including an earbud 29, an ear frame 30, and a one-sided, flexible fabric 31 which are all located on the outside of apparatus 17. Of all internal components, the speaker 32 remains closest to the right side of the device, the side closest to a user's left ear, and the flexible fabric 31 separates speaker 32 from the outside of apparatus 17. The earbud 29 includes an internal speaker, thus earbud 29 located inside a user's ear and the speaker 32 located inside apparatus 17 are individual speakers working together to provide a surround sound system. At the top of the apparatus 17 sits an array of telescopic extension tubes 20 which includes extension tubes 25, 24, 23, and 22 extracted outside of the extension tube housing 21. The display 18 and a flashlight 47 are attached to an extra small extension tube 25 by swivel 26. The flashlight 47 may also be completely excluded from apparatus 17, or positioned at any location that assists with enabling nighttime illumination or bright light when needed.

The extra small extension tube 25 fully extends outside of a small extension tube 24, which fully extends outside of a medium extension tube 23 such that extension tubes 25, 24, and 23 fully telescope outside of a large extension tube 22 and outside of the extension tube housing 21. The swivel 26 connects to the front end of the extra small extension tube 25 which may be set in motion by its back end attachment to the front end of a drive cable 38. The top of drive cable 38 is smooth while the bottom includes teeth that come in contact with a large gear 37.

A protective layer 39 features an entrance for the drive cable 38 to enter or exit a drive cable housing 40, located above the large gear 37, but separated by the protective layer 39. The protective layer 39 also functions to isolate the rotating gears, both the large gear 37 and a small gear 36 from the circuitry inside the apparatus 17. The drive cable housing 40 facilitates the coiling and secure storage of the drive cable 38 when retracted so that it may maintain its circular shape and not touch any other part inside the apparatus 17 other than large gear 37, and the bottom of the extra small extension tube 25. The drive cable 38 must be flexible enough so as to become comfortably coiled inside the drive cable housing 40 without fracturing or losing mobility. To assist in this goal, an alternative embodiment may include an idler pulley located at some point on or near the entrance of drive cable 38 into the extension tube housing 21, making contact with the top flat side of drive cable 38 opposite the side with teeth to support its movement into and out of the extension tube housing 21.

The camera 27 receives inputs transmitted to a circuit board 42. A battery 35 connects to the ear bud 29, speaker 32, a charge port 33, the motor 34, the circuit board 42, a light-emitting diode 70, and the camera 27. The circuit board 42 may feature a motion sensor 41 or other type of inertial measurement unit, a central processing unit 43, a memory 44, a Wifi module 45, and a microphone 46 as well as all other necessary electronic components such as transistors, resistors, capacitors, and transmitters needed to enable their functionality. In order to execute tasks, the central processing unit 43 receives further inputs from and works synchronously with processor units 49. The cover of apparatus 17 features a touch sensitive power button 28 placed over the internal light-emitting diode 70.

In some embodiments, the power button 28 may feature alternative forms of the internal light-emitting diode 70. The total number of light-emitting diodes (LEDs) that may be featured on apparatus 17 and the LED 70 assembly form factor or arrangement may be modified to produce different colors at different times and locations on the apparatus 17. Bio luminescent light or bio-light that uses techniques seen in living organisms such as algae and bacteria, among others, to provide a programmable LED-type display may also replace traditional LEDs. A distributed LED assembly may encompass the entire apparatus 17 and individual lights may synchronize to produce images, patterns, and colors as a whole.

Additionally, the apparatus 17 may become more formidable and compact by placing the motor 34, battery 35, and circuit board 42 directly underneath a main gear housing compartment in a numbered top-down hierarchy of the main large gear 37 first, the small gear 36 second, motor 34 third, circuit board 42 fourth, and battery 35 fifth or any variation of the numbered hierarchy found to favor a more functionable design. The apparatus 17 may also include an air vent and a corresponding assembly of fans to prevent circuit board 42 from overheating.

Figure 4A:
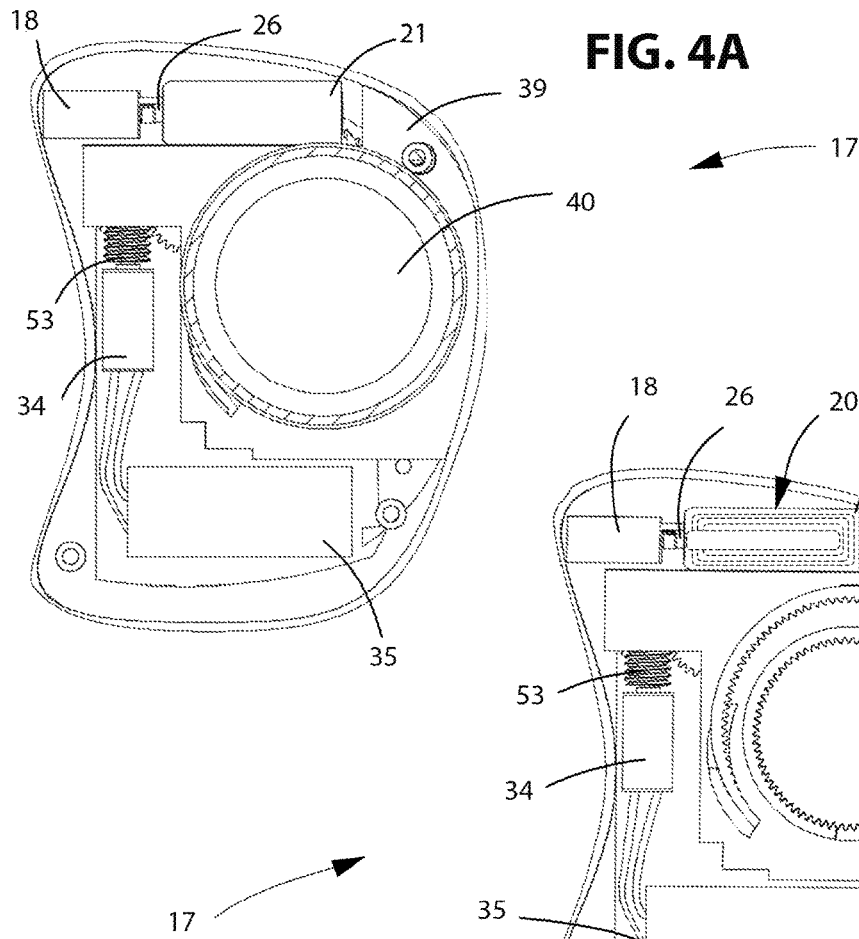
FIG. 4A-C illustrates the first embodiment's internal mechanism.

FIG. 4A illustrates apparatus 17 when retracted. The extension tube housing 21 sits next to the swivel 26 which attaches to the display 18. The display 18 and swivel 26 always remain outside of the array of telescopic extension tubes 20 independent of whether telescopic extension tubes 20 are extended or retracted. The protective layer 39 separates the apparatus internal mechanism from the rest of the components. The drive cable housing 40 sits on top of the protective layer 39 and has the purpose of confining the coiling of the drive cable 38 into this area upon retraction so that the movement of drive cable 38 may not interfere with other components. The motor 20, powered by the battery 35, actuates worm gear 58. The drive cable 38 may be a flexible plastic or made of any derivative of plastic or other material durable enough to properly extrude the array of telescopic extension tubes 20 without snapping or dislocating itself.

Figure 4B:
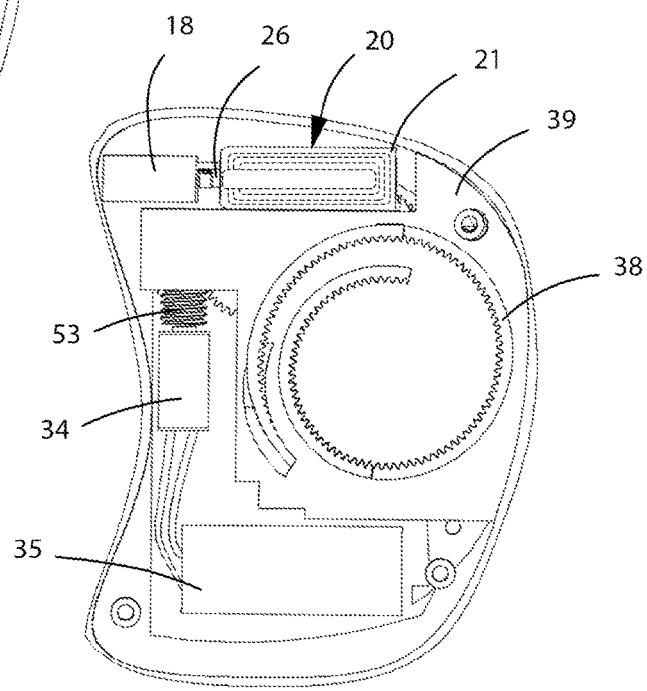

FIG. 4B illustrates apparatus 17 when retracted and does not show the drive cable housing 40. The protective layer 39 separates drive cable 38 from the internal mechanism of apparatus 17. The apparatus internal mechanism actuates drive cable 38 so that it may drive the extrusion of the array of telescopic extension tubes 20 and thus the display 18. Upon retraction of display 18, drive cable 38 will coil on top of the protective layer. This may be accomplished by battery 35 powering motor 34 which actuates the worm gear 53.

Figure 4C:
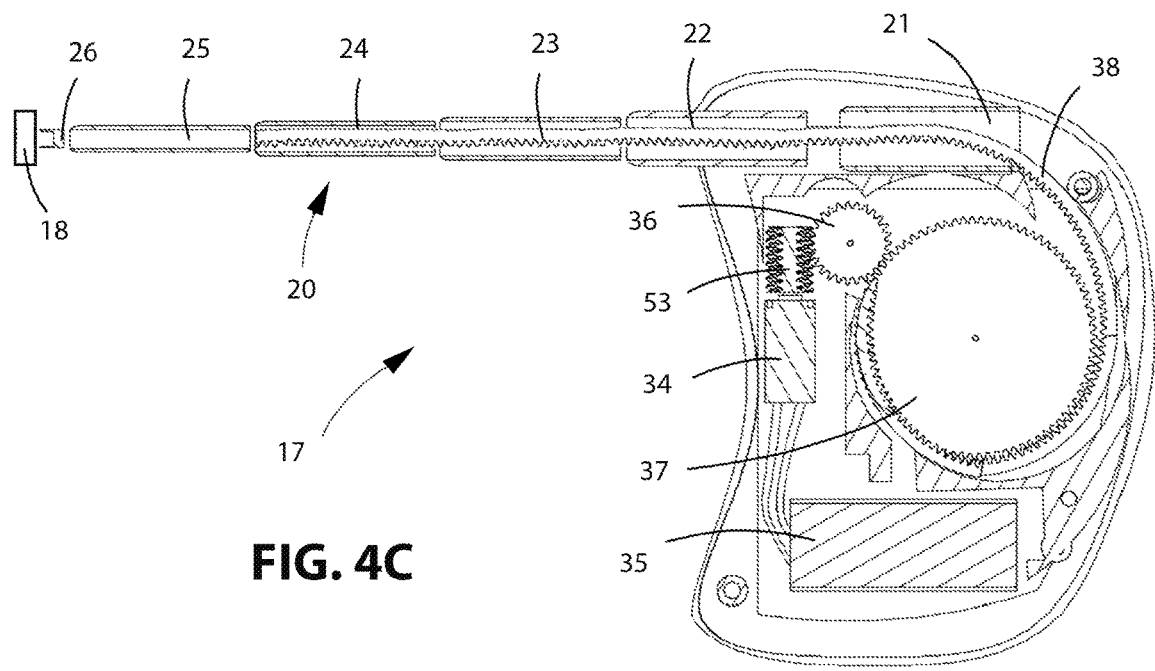

FIG. 4C illustrates a sectional view of apparatus 17 with an extracted array of telescopic extension tubes 20. This view does not show the protective layer 39 nor the drive cable housing 40. The extra small extension tube 25 attaches to swivel 26 which connects to display 18. The drive cable 38 attaches to the bottom end of extension tube 25 and travels inside the extension tubes 24, 23, and 22, as well as the extension tube housing 21. The extension tube housing 21 serves as a base to hold the array of extension tubes 25, 24, 23, and 22 used to perform the extraction and retraction mechanisms. An electrical mechanism containing the motor 34 which rotates a set of interconnected gears either forward or backward to create the respective extraction and retraction mechanism of the array of telescopic extension tubes 20 is also shown. The battery 35 powers motor 34 and uses an attached worm gear 53 to rotate gear 36 which rotates gear 37. The gear 37 remains the only gear that makes contact with the drive cable 38 during its transition into and out of the drive cable housing 40.

In other embodiments, different designs or varying proportions of gears may be adopted so that they may function together at optimized states to produce the shown extraction and retraction mechanism. To increase or reduce torque, the total number of gears used may change. Also, one or more single gears may take the form of double-sided gears, with either side making contact and thus rotating different parts. Different sized motors may also be used to power the extraction and retraction mechanism. Similarly, the worm gear 53 may be built into the motor 34; thus creating a single part. The drive cable 38 is not limited to fit inside a circular coiled housing and can take on any other shape other than a circular coil for purposes of storing the drive cable 38 inside a housing cover.

FIG. 5A illustrates a third embodiment of the apparatus 17 when retracted and features an array of telescopic extension tubes 20 with magnetic properties. The swivel 26 separates display 18 from a solenoid 57 which contains a conical spring 54, washer 55, and magnetic wire 56. The bottom end of spring 54 attaches to a washer 55 which separates spring 54 from the magnetic wire 56. Upon retraction of display 18, the spring 54 completely compresses and solenoid 57 locks extension tube 24 in place. The circuit board 42, powered by battery 35, connects to solenoid 57. The camera 27 transmits information to circuit board 42 for processing in order to control the extraction and retraction mechanism by means of actuating the solenoid 57. The electromagnetic force of solenoid 57 pulls in the magnetic array of telescopic extension tubes 20 in the order of extension tube 21, 22, 23 and stops once extension tube 24 locks inside solenoid 57. The only extension tube that may remain partially outside of the solenoid 57 is the extra small extension tube 25.

FIG. 5B illustrates a third embodiment of apparatus 17 and the magnetic array of telescopic extension tubes 20 when fully extracted. The display 18 connects to the extra small extension tube 25 by means of the swivel 26. The top of the spring 54 connects to the top of extra small extension tube 25 and becomes extended as the array of extension tubes 21, 22, 23, and 24 are released from tension upon the solenoid 57 unlocking the array of extension tubes 20 from inside the magnetic wire 56. The bottom of spring 54 attaches to the washer 55; this holds the bottom end of the spring 54 in place during the extraction. Upon retraction; the display 18, swivel 26, and the array of extension tubes 20 become pulled inside apparatus 17 via an electromagnetic force controlled by the circuit board 24 and actuated by the solenoid 57.

In some embodiments, varying types of sensors with different specific purposes may be used to enhance the apparatus sensing capability. Such sensors may collect inertial measurement as well as temperature data in the case that the apparatus 17 must change shape in order to avoid collision or certain weather. The camera 27 may also be upgraded to ensure higher pixel definition, image recognition, and depth data. Likewise, the camera 27 is not limited to the illustrated embodiment and may have lenses spread throughout any surface of the apparatus 17. The circuit board 42 and all electronic components may become upgraded or modified to include additional features without departing from the original spirit and purpose of the embodiment.

Similarly, the software that runs on the circuit board 42 is also modifiable and subject to periodic updates that allow the integration of new software on the apparatus 17. In addition, the circuit board 42 may be divided into several connected circuit boards to manage component spacing and placement within the apparatus 17. The battery 35 may also be modified to include not only different types and voltages of battery power, but different sources as well. For example, the embodiment may also function with a solar powered battery. The number of solar panel cells for power storage may also vary. The battery 35 may also carry modified amounts of voltage across several parts including, but not limited to speakers, earbuds, cameras, microphones, flashlights, LEDs, LCD's or other types of displays.

FIG. 6A illustrates the third embodiment of the apparatus 17 when retracted and also shows a retracted protective sleeve 58. The display 18 remains retracted via an electromagnetic mechanism actuated by the solenoid 57. The circuit board 42, powered by battery 35, receives and processes information from the camera 27 to control solenoid 57.

FIG. 6B illustrates the third embodiment of the apparatus 17 when extracted and also shows the magnetic array of telescopic extension tubes 20 covered by the protective sleeve 58. The solenoid 57 actuates the extraction of the magnetic array of telescopic extension tubes 20 shielded by the protective sleeve 58. The protective sleeve 58 protects the internal array of telescopic extension tubes 20 from outside contact. Upon extraction, the sleeve 58 extends outward and the swivel 26 turns the display 18 at an angle. In alternative embodiments, the protective sleeve 58 may be any extendable material that accomplishes the same purpose.

Figure 7A:
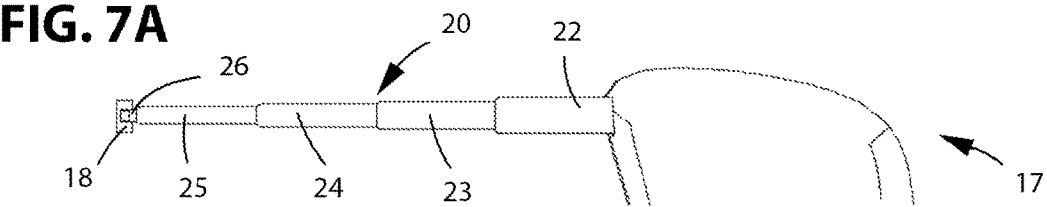
FIG. 7A-G illustrates the first embodiment's telescoping extension tubes extending from conspicuous to inconspicuous modes of operation.
Figure 7B:
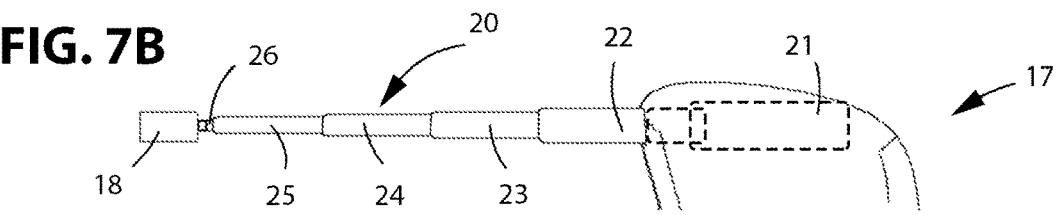
Figure 7C:
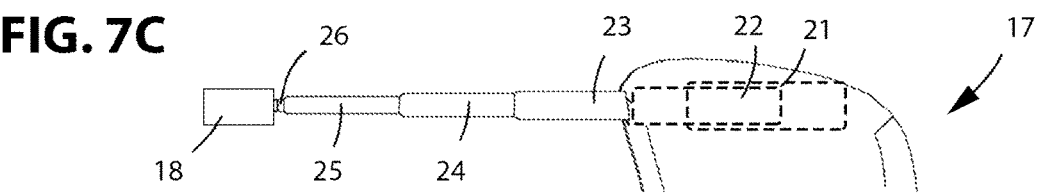
Figure 7D:
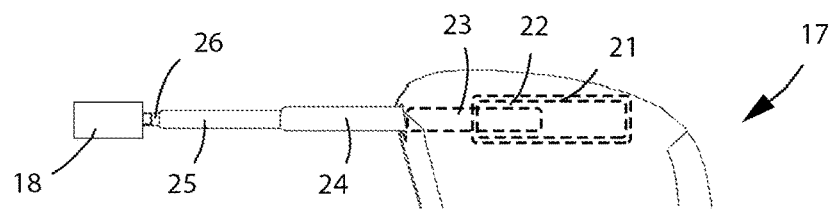
Figure 7E:
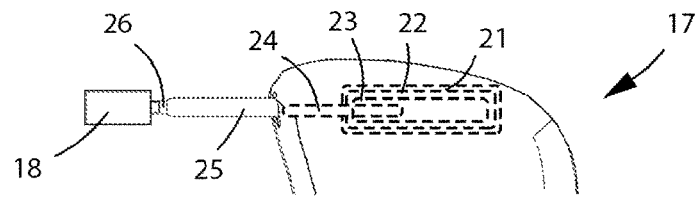
Figure 7F:
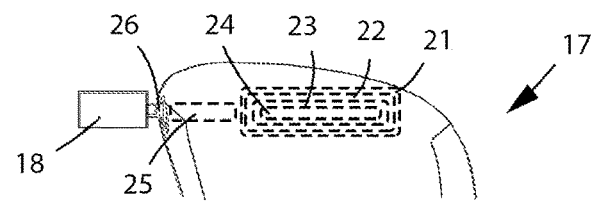
Figure 7G:
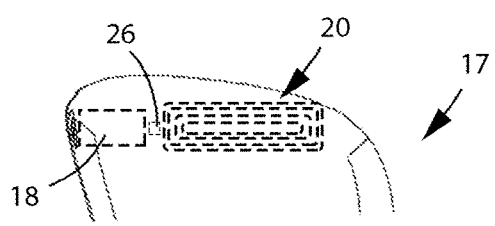

FIG. 7A-G illustrates the first embodiment's retraction process for an extended apparatus 17. In FIG. 7A, the array of telescopic extension tubes 20 connects to apparatus 17. As the extension tubes 22, 23, 24, and 25 have reached the length of their extent, swivel 26 has turned the display 18 at an angle. In FIG. 7B, the array of telescopic extension tubes 20 begins to retract with swivel 26 rotating the display 18 at an angle in order to facilitate retraction inside the apparatus 17. In FIG. 7C, the extension tube 22 retracting inside the apparatus 17 shows the initial retraction mechanism. In FIG. 7D, extension tube 23 retracts inside extension tube 22. In FIG. 7E, extension tube 24 retracts inside extension tube 23. In FIG. 7F, all telescopic extension tubes 20 now remain inside the apparatus 17. Due to adjustment preferences, the distance of individual extension tube retraction may vary. In FIG. 7G, all extensible parts, including the display screen 18 and swivel 26 are now fully retracted inside apparatus 17.

In alternative embodiments, the hollow cylindrical extension tubes may be replaced by any variety of telescoping device or assortment of telescoping parts, without regard to their size, shape, or material in order to create a number of alternate forms for the display's extension and retraction mechanism. The extraction and retraction mechanism is not limited to cylindrical shaped tubes, and may instead be accomplished by other styles of origami or geometric shapes composed of either metals, plastics, manufactured programmable smart material, or other material that allows for operation of the apparatus 17. Programmable smart material may refer to nanobots or small individual computer circuits that are grouped together via electromagnetic means for shifting minicomputers in relation to one another in such a way that individual minicomputers are able to reassemble in relation to one another and thus create an entirely different shape as a whole.

Figures 8A, 8B:
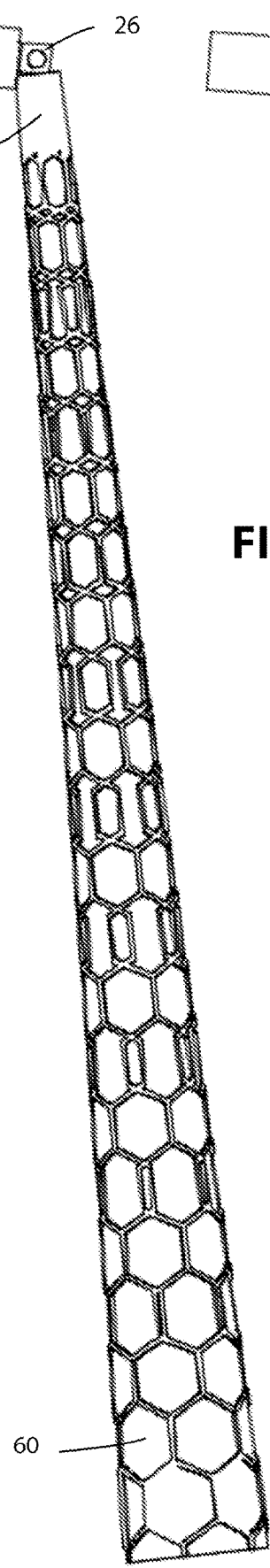
FIG. 8A shows the first embodiment's array of telescoping extension tubes that guide the display's extraction mechanism and FIG. 8B shows a fourth embodiment for a telescoping mechanism.

FIG. 8A shows the array of telescoping extension tubes 20 residing within one another so as the smaller tube resides within the larger tube. Upon extraction, the telescopic extension tubes 25, 24, 23, and 22 are connected to form the extraction and retraction mechanism, following the lead of the extra small extension tube 25. The swivel 26 makes display 18 apparent once the extension tubes 25, 24, 23, and 22 have reached the length of their extent. Once the smallest extension tube, extra small extension tube 25, has reached the maximum point of extrusion from the apparatus 17, all extension tubes lock in place as the end of their respective tube lengths has been reached. The extension tube 25 pushes the array of telescopic extension tubes 20 forward in order to carry display 18 to the front of the user's field of vision and position the display screen above or near the eye. The array of telescopic extension tubes 20 should be made of a material not easily moved by wind, rain, water or any rapid movement of the user, and instead stay fixed in place, yet possess enough flexibility to resist impact with other objects while maintaining its original shape. More so, the entire area of telescopic extension tubes 20 or a specific area of tubes may be made of titanium alloy, or other magnetic material that may be a derivative of iron. The swivel 26 may be made of a magneto elastic fluid or other form of viscoelastic material that allows for varied angular rotation of the display 18.

In some embodiments, the swivel 26 attached to display 18 may be entirely excluded from the extraction and retraction mechanism if the display 18 already includes a swivel, or if the apparatus 17 has no need to turn the display 18 at an angle. Additionally, the array of extension tubes 20 may also internally house conductive wiring and flexible circuit boards that connect to the display screen.

FIG. 8B shows a fourth embodiment that uses an assortment of interconnected geometric plates 60 that are binded by a flexible material 59 and extend the display 18 to its desired length. Together, the swivel 26, flexible material 59 and geometric plates 60 form a programmable arm 62. In alternative embodiments, the array of telescopic extension tubes 20 may take the form of any programmable material able to expand or stretch in a given direction. For example, the geometric plates 60 may be composed of interconnected yet individual magnetic nanobots that bind to each other via a flexible material 59 in order to extrude the display 18 and in doing so, form any predetermined shape.

Figure 9A:
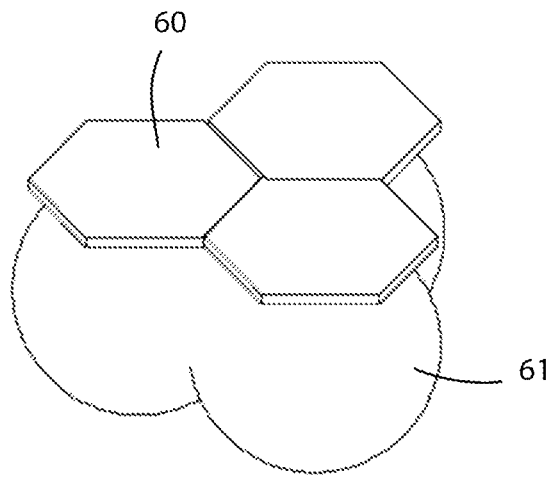
FIG. 9A-C illustrates the fourth embodiment's robotic structure for self assembly.
Figure 9B:
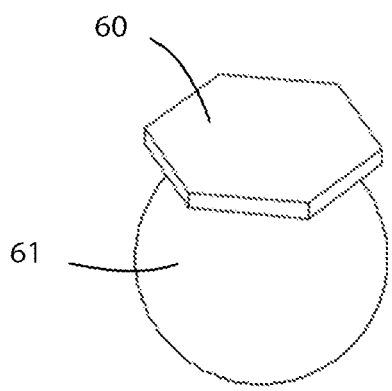
Figure 9C:
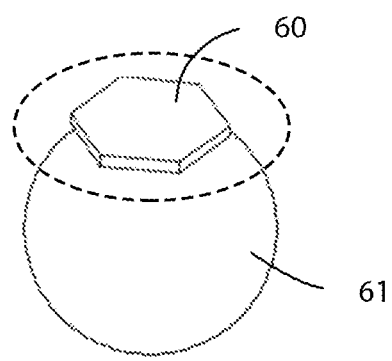

FIG. 9A-C illustrates the fourth embodiment of a robotic structure for self assembly. FIG. 9A illustrates a group of programmable matter 61 and their corresponding geometric plates 60 that together create a telescoping mechanism. Once this group multiplies by connecting with other groups, a larger structure may be formed. This cycle repeats itself until the desired shape has been accomplished. FIG. 9B illustrates an individual unit of programmable matter 61. The unit of programmable matter may contain a shaped geometric plate 60 that resembles a polygon or any other geometric shape that accomplishes the same purpose of communicating with and physically attaching to other units. FIG. 9C illustrates an individual unit of programmable matter once the geometric plate 60 from FIG. 9B has resized itself into a smaller shape. The geometric plate 60 resizes itself into a smaller shape to aid the individual unit of programmable matter 61 in moving across a distance upon retraction of the formed structure. Likewise, the unit of programmable matter 61 expands the geometric plate 60 in order to connect to other units and form a structure that extends based on the movement of the individual units of programmable material 61.

In some embodiments, the units of programmable material 61 may contain a rechargeable battery, electromagnets to actuate movement, sensors to measure distance, motors and microcontrollers to control movement, light-emitting diodes, and an infrared transmitter and receiver to communicate via light with other units. However, the unit of programmable matter is not limited to these components and can contain any addition that aids in accomplishing its purpose.

Figure 10:
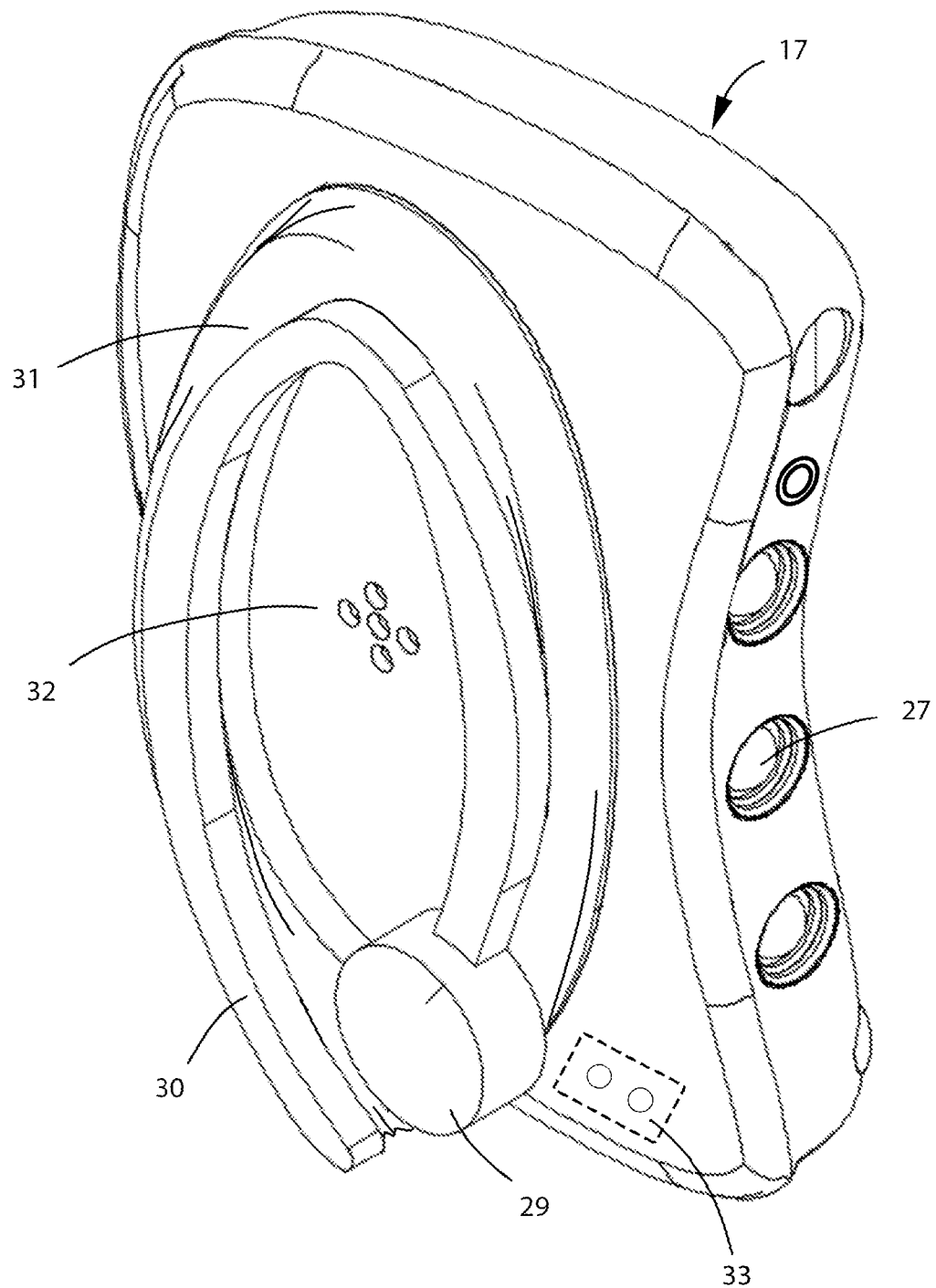
FIG. 10 shows the ear frame fastened to the apparatus by a flexible fabric.

FIG. 10 shows a first embodiment's front right side angular view of the flexible fabric 31 used to bind the entire magnetic ear frame 30 around the edge of the apparatus 17. The ear frame 30 has the purpose of wrapping around a user's ear for support while placing the earbud 29 inside a user's ear. The fabric 31 attaches along the edge of ear frame 30's entire length to cup over the user's ear. The fabric 31 stretches enough to allow for the ear of a user to fit snugly between the ear frame 30 and apparatus 17 without discomfort due to tightness or loss of stability due to not being tight enough. The flexible fabric 31 binds along the entire extent of the ear frame 30, attaching ear frame 30 to the apparatus 17, thus forming a small, negligible area of fabric 31 while not worn and a slightly expanded, stretched area while worn. A user's ear flap comfortably fills the internal area of fabric 31. The fabric 31 also separates the right side of the device from internal parts. To promote the stability of apparatus 17 on a user's ear while worn, the magnetic inner edge of apparatus 17 surrounding the speaker 32 forms a magnetic flux or magnetic field between the magnetic ear frame 30.

In some embodiments, magnets of different shapes, forms, and strength may be added and rearranged in different ways to produce an optimized flux density with the purpose of reducing the overall weight of the apparatus 17 on the user's ear. Additionally, the audio speaker system may be modified to include different forms of communicating sound and interfacing with the user. The apparatus 17 may use other human body parts to transmit sound through vibrations such as bone conduction or integrate adaptations for brain scan cues, resulting in neurological data input. The earbud 29 may also mold to the user's ear shape. Thus, the entire earbud 29 and apparatus speaker 32 may be replaced, modified, or become entirely excluded from alternative embodiments to accomplish the auditory purpose of apparatus 17. Additionally, the ear frame 30 may be significantly altered in shape and style for comfort and design preferences. Ear frames may also be made of a programmable smart material that allows for adjustment to a user's unique ear shape. More so, the ear frame material may also change so that it may provide more comfort, durability, and reduce the overall weight on a user's ear. Also, the ear cushion on the inside of the apparatus 17 along with the flexible fabric 31 surrounding the user's ear may be of an alternate material, shape, area, or any combination thereof. Other charger ports or drivers such as HDMI and USB as well as varied implementations of wireless technology may become integrated to entirely replace or assist charge port 33 in charging the apparatus 17.

Figure 11:
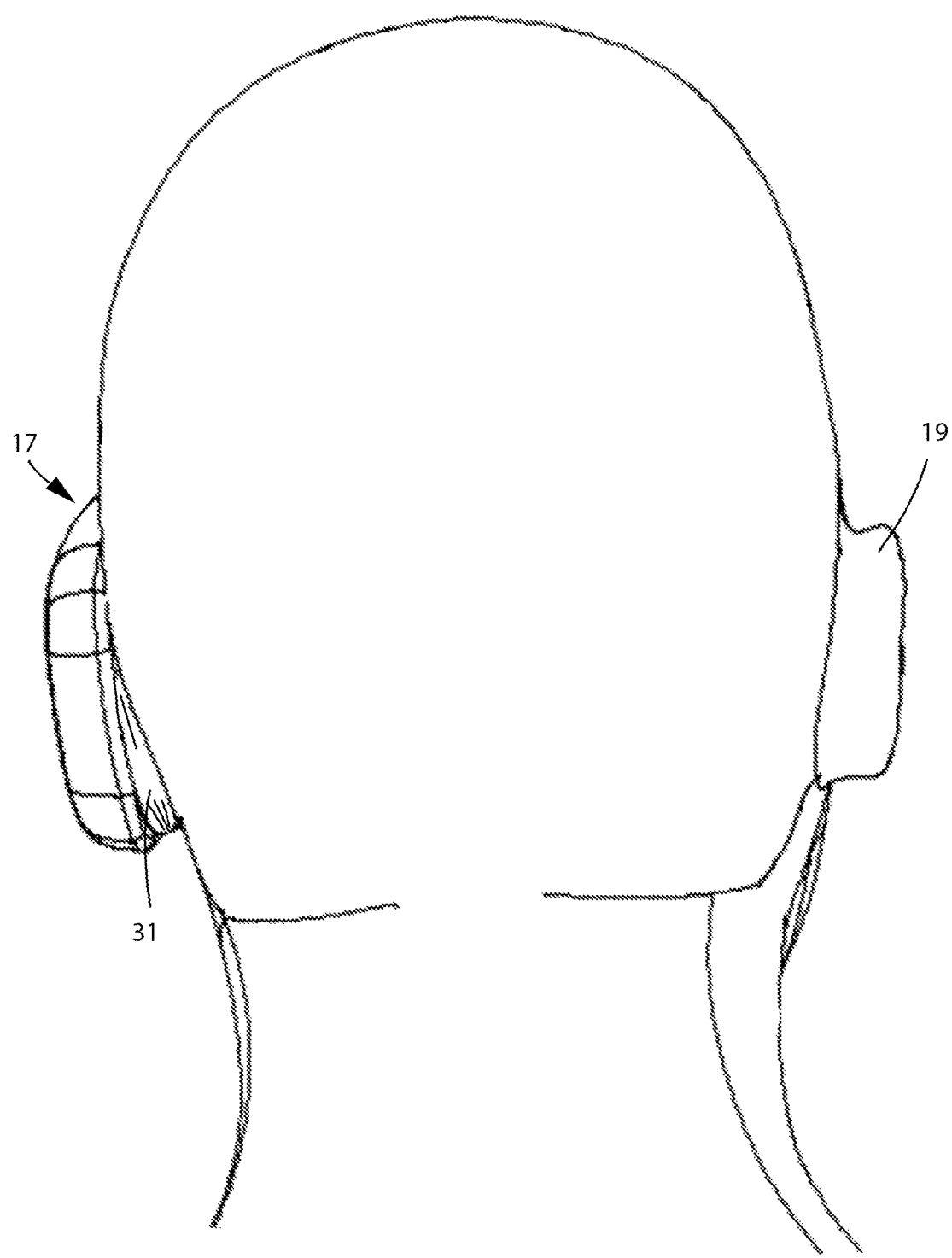
FIG. 11 illustrates an angular, rear view of the apparatus being worn on a user's left ear.

FIG. 11 illustrates a first embodiment of the apparatus 17 worn on a user's head. As illustrated, the fabric 31 covers the entire left ear of the user's head. From this perspective, only the fabric 31 and apparatus 17 may be visible, not the user's ear due to the fact that it is completely enclosed within the fabric 31. The right ear 19 is bare as it is not covered by any part of the apparatus 17. Alternative embodiments allow wearing the single apparatus 17 on either ear or two apparatuses on both ears. Thus, the same description is also true of the opposite ear when the apparatus 17 is worn on the right ear.

Figure 12:
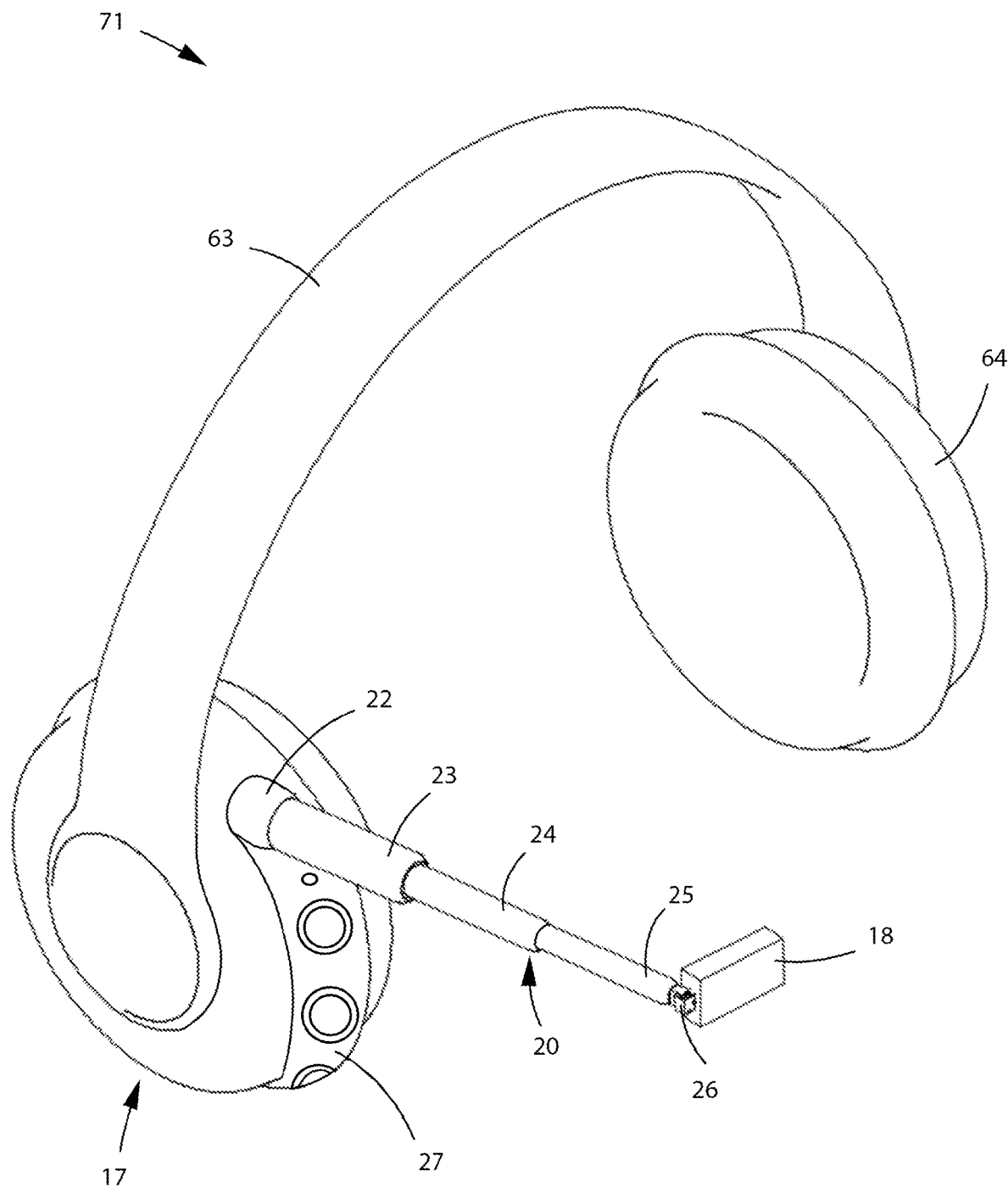
FIG. 12 illustrates a fifth embodiment with two apparatus and a detachable bridge connecting the pair.

FIG. 12 illustrates a fifth embodiment of the apparatus 17 attached to a second apparatus 64 by means of a connection bridge 63. The display 18 connects to swivel 26 which remains fully extended by means of the array of telescopic extension tubes 20 featuring tubes 25, 24, 23, and 22. In this fourth embodiment, the camera 27 also has the purpose of transmitting position and depth, among other information, to display screen 18, as well as relaying information between the apparatus 17 on the right and an apparatus 64 on the left. Thus, apparatus 17 is not limited to a monocle-style design and may also form an interconnected apparatus 71. The interconnected apparatus 71 may be worn on both ears for purposes such as noise cancellation. Doing so does not depart from the scope and spirit of a transformable apparatus with a retractable display screen. Additionally, the bridge 63 may become magnetically attached and detached from the monocle-style apparatus 17 so that apparatus 17 can be operated as either just a monocle or an interconnected apparatus 71 along with bridge 63 and apparatus 64. Additionally, the bridge 63 is not limited to a bridge that crosses over the head and can also take the form of a plastic rubber band that is worn loosely behind the head. The bridge 63 may also be completely excluded if both apparatuses are connected via bluetooth and worn independently on each ear.

In some embodiments, the display 18 may become upgraded or replaced by different sized and shaped displays that accomplish the same purpose. Likewise, display 18 can present images, text, and holograms that are either projected directly into a user's eye, reflected on the display, both simultaneously, or either of the two alone. The apparatus 17 may also feature other attachments that can also be added without departing from the original purpose of a transformable apparatus with retractable display.

Figure 13:
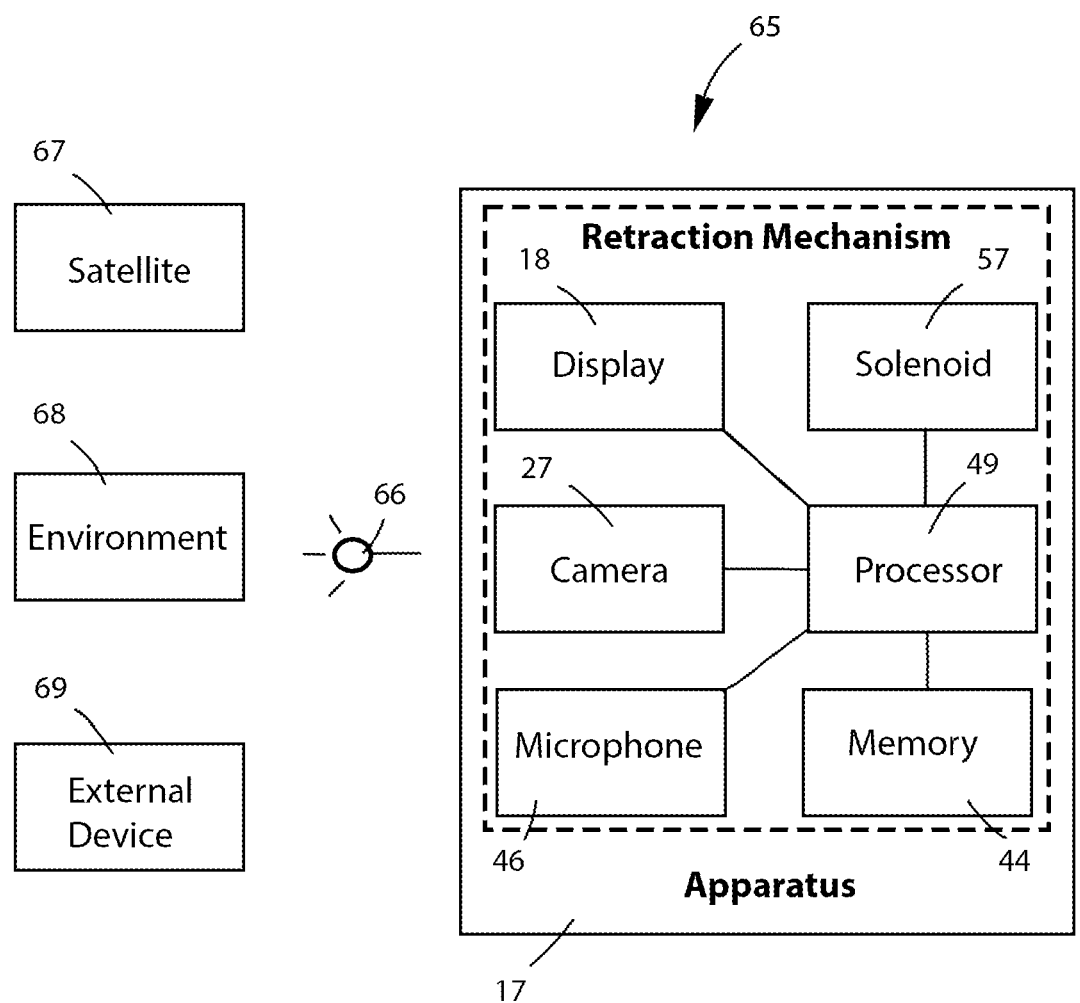
FIG. 13 is a block diagram of an example apparatus.

FIG. 13 is the third embodiment's block diagram of the extraction/retraction mechanism 65 that enables apparatus 17 to retract display 18 when not in use and extend display 18 when in use. The camera 27 delivers inputs to the processor units 49 associated with the environment outside the apparatus 17. The microphone 46 also delivers inputs to the processor units 49 associated with verbal speech generated by the user of apparatus 17. The display 18 shares and receives data from the processor units 49. The processor units 49 actuate the solenoid 57 to perform the extraction and retraction of the display 18 by actuating the attached telescopic extension tubes. Together with the processor units 49; display 18, solenoid 57, camera 27, and microphone 46 may store and access saved data from the memory 44. Accordingly, apparatus 17 may broadcast information via a wireless connection 66 in order to transmit data to and from a satellite 67, a user's environment 68, and any external device 69. The satellite 67 may be positioned at any type of orbit including but not limited to low Earth orbit, medium Earth orbit, geostationary orbit, or elliptical orbit.

Additionally, while in outer space, the apparatus 17 may communicate back to Earth using any combination of Earth-based radio antennas capable of communication with interplanetary spacecraft. The environment 68 may represent any space interpreted by the camera 27 and any of the sensors included in the apparatus 17. The external device 69 may be a computer, mobile device, server, or system intended to share and receive data from other computers such as apparatus 17.

The extraction/retraction mechanism 65 detailed within the dotted line is not limited to the hardware components shown in the diagram. The extraction/retraction mechanism 65 may also encompass other components such as the telescopic extension tubes 20 to aid the solenoid 57 in reaching the display 18 to a certain length, speaker 32 and microphone 46 to aid the processor units 49 in receiving voice commands as inputs, as well as all other circuitry and electrical components involved in performing the extraction and retraction mechanism 65 herein described. The extraction/retraction mechanism 65 may also cooperate with other hardware components needed to perform additional tasks that enable the overall functionality of apparatus 17.

Figure 14A:
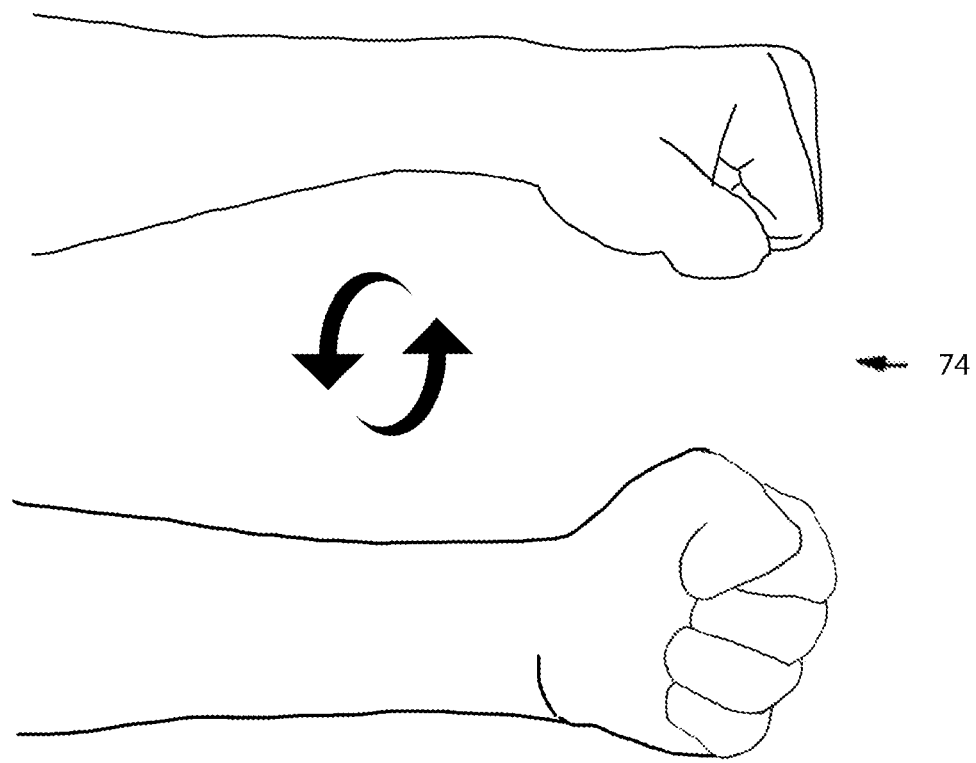
FIG. 14A-C shows a wrist-flick hand gesture that extracts and retracts the apparatus display.

FIG. 14A illustrates an alternate wrist-flick hand gesture 74. The wrist flick gesture 74 is performed by twisting the wrist outwards and then bringing the wrist back to its starting position in one single rapid motion. A left hand wrist flick would twist outwards to the left and a right hand wrist flick would twist outwards to the right.

Figure 14B:
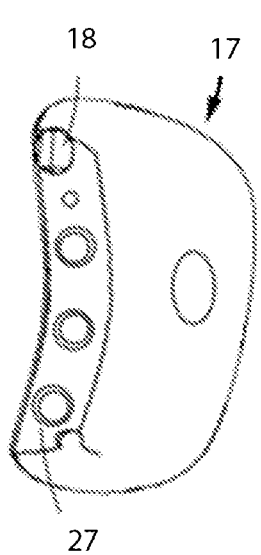

FIG. 14B illustrates the apparatus 17 and the display 18 retracted. A hand gesture recognized by camera 27 will cause the extrusion of the display 18 and vice versa.

Figure 14C:
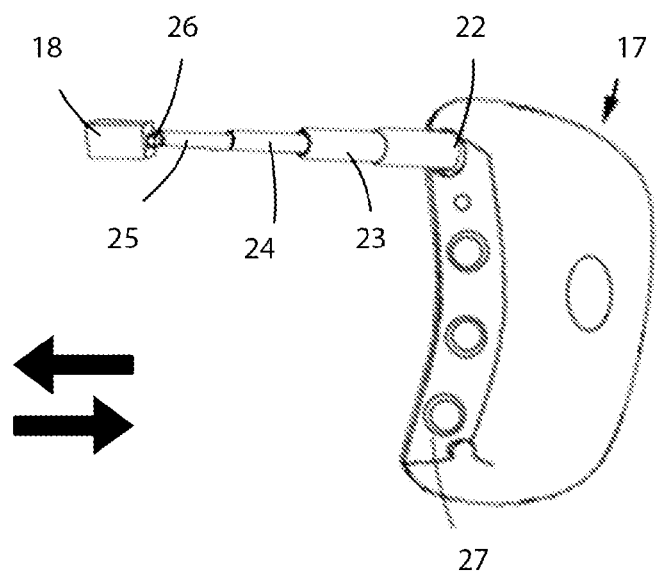

FIG. 14C illustrates the apparatus 17 ready to retract. This is accomplished by the swivel 26 turning display 18 before being pulled inside the apparatus 17 by telescoping tubes 25, 24, 23, and 22. In other words, if the display 18 is already extended as shown, a hand gesture results in the retraction of the display 18 and vice versa.

In alternative embodiments, a different hand gesture may be performed in order to control the extraction and retraction of the display 18. Alternatively, users may create their own air wave hand gestures and save them on the device in order for the apparatus 17 to recognize these movements and extract or retract the display 18 accordingly.

Figure 15A:
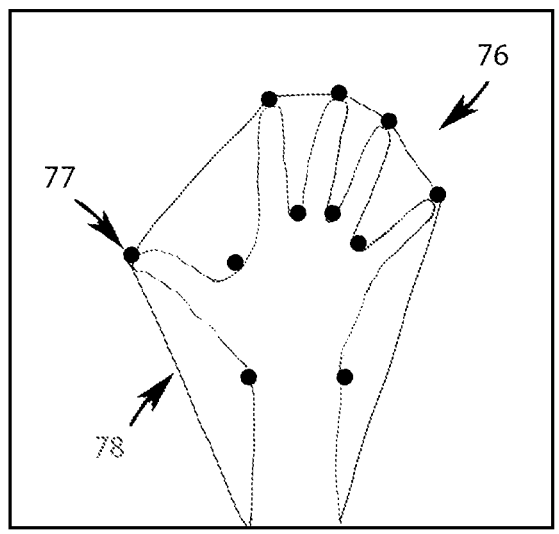
FIG. 15A-D shows varied hand gestures that function as camera-to-processor inputs.

FIG. 15A illustrates how an open palm hand gesture 76 made by the user may be recognized as a camera-to-processor input 80. The focus points 77 are generated by a combination of all processors to identify the position of the fingers on the hand and thus determine how many fingers are being held up at a given moment in time. The hand outline 78 serves to help isolate the user's hand from background noise in the image captured by the camera-to-processor input 80 and thus create a region of interest as input for further processing.

Figure 15B:
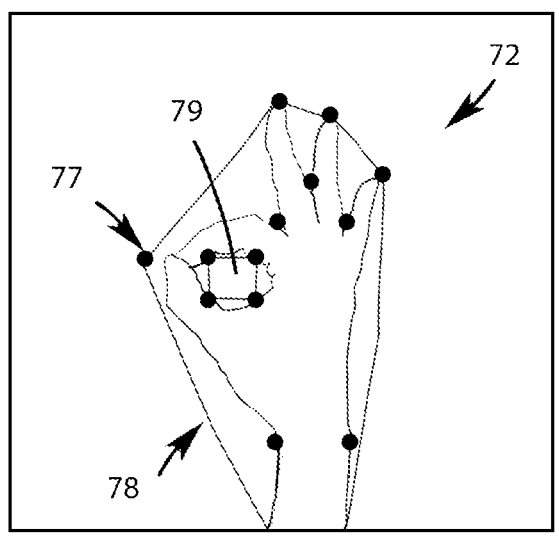

FIG. 15B illustrates how the extend hand gesture 72 made by the user may be recognized as a camera-to-processor input 80. Here, a separate square focus box 79 is drawn around the ellipse created by the thumb and index finger as part of the extend hand gesture 72. This square focus box 79 is a separate region of interest that allows apparatus 17 to determine that the hand gesture shown is indeed hand gesture 72. The square focus box 79 may change shape or form based on different hand gestures and the unique, varied regions of interest captured from such hand gestures by the camera-to-processor input 80.

Figure 15C:
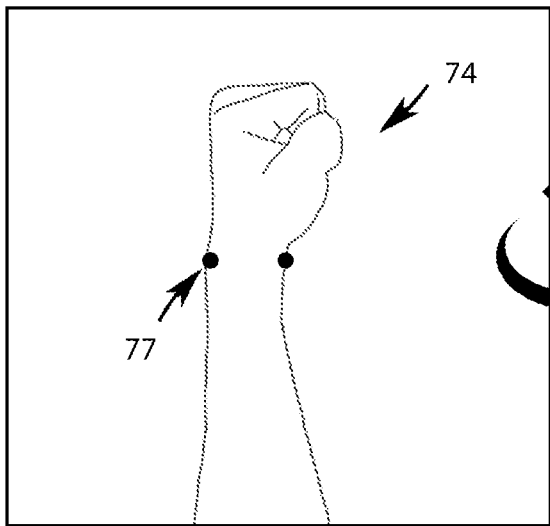
Figure 15D:
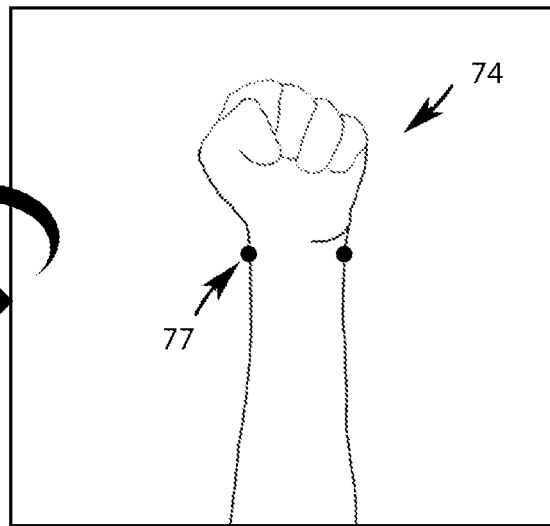

FIG. 15C-D illustrates how a transformation of focus points 77 located on the wrist of the user performing the wrist-flick hand gesture 74 may also be recognized as a camera-to-processor input 80. In FIG. 15C, the focus points 77 begin at a given coordinate and are transformed by the wrist-flick movement involved in performing the wrist-flick hand gesture 74. FIG. 15D shows the intermediate stage of the wrist-flick hand gesture 74 before the hand returns to the final stage of the wrist-flick movement shown in FIG. 15C. Such transformation of coordinates may be recognized as a hand gesture. Alternatively, the focus points may also be centered on different parts of the hand, human body, and other objects captured by the camera-to-processor input 80.

Figure 16:
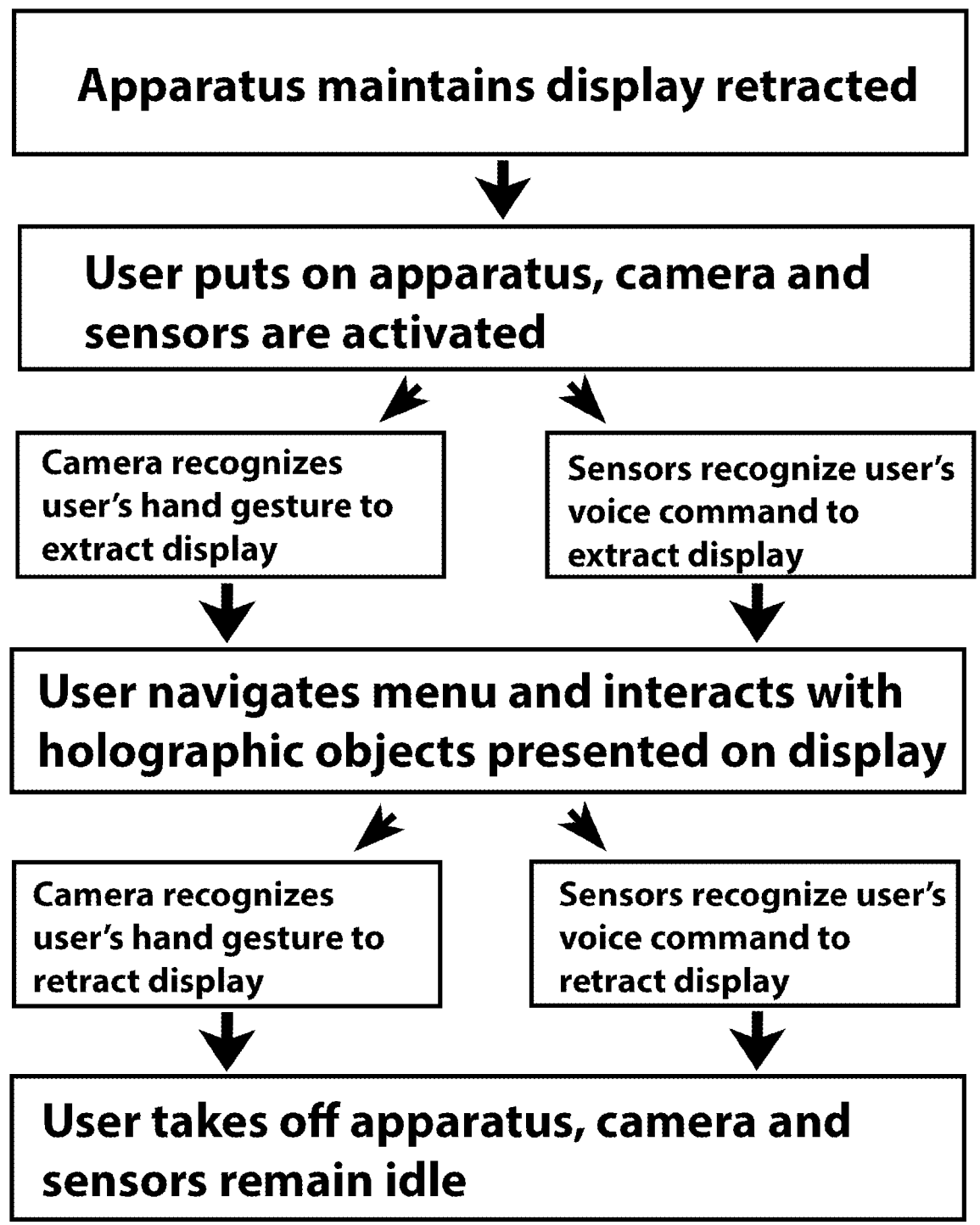
FIG. 16 details a flowchart of the procedure for extracting and retracting the apparatus display.

FIG. 16 illustrates a flow chart of the process for actuating the extraction and retraction mechanism. First, the apparatus 17 maintains the display 18 retracted and housed inside the apparatus 17. Once the user puts on the apparatus 17, the camera and sensors become active and begin processing the outside environment. At this point, the user may extract the display with hand gestures made within the field of view of the camera, a voice command, or a combination of both. Once the display is extended, the user may interact with holographic objects presented on the display in order to navigate the apparatus menu and other features. Similarly, the user may then retract the apparatus 17 by making a hand gesture within the field of view of the camera, a voice command, or a combination of both. The user may also combine hand gestures with voice commands, for example; using a voice command to extend the display and making a hand gesture to retract the display. Once the user finishes using the apparatus 17 and takes it off, the camera and sensors remain idle until the next user initiated session.

The aforementioned embodiments are all alternative means to achieve the same result and operation of the transformable apparatus with a retractable display. Likewise, other embodiments susceptible to modification and change are not limited to the specificities mentioned and thus are also a part of the disclosure. Therefore, the described embodiments should not be construed as limitations on the scope, but instead as examples of several embodiments possible. Hence, the scope of the disclosed embodiments should be determined by the annexed claims, rather than by the illustrative examples provided.

I claim:

1. An electronic apparatus for automatically extending and retracting a display inside and out of an ear-mounted speaker audio system with at least one air wave hand gesture and speech pattern, useable with depth cameras and microphones attached on said ear-mounted speaker audio system as well as other sensors and transmitters, comprising:
    a display;
    a speaker audio system including a detachable bridge and speakers, wearable on either a single ear with one speaker detached, or both ears of said user when said additional speaker is attached via said apparatus bridge;
    an extraction and retraction mechanism, wherein said extraction and retraction mechanism includes an electronic swivel and an array of hollow, telescoping extension tubes set in motion by a drive cable and assortment of rotating gears actuated via a motor, said drive cable which guides the extension of said telescoping tubes when extruded and upon retraction of said telescoping tubes said drive cable coils inside of said speaker audio system, secured in place by a drive cable housing cover to prevent said drive cable from interfering with other parts:

said electronic swivel which rotates said display from a vertical angular direction upon extrusion, to a horizontal angular direction once fully extended, placing said display within the user's field of view and then inverting said angular motions when preparing to retract back inside of said speaker audio system;

an aperture inside of said ear-mounted audio speaker for housing said display, said swivel, and said telescopic extension tubes when retracted:

at least one microphone that interprets voice commands made by the user that are used by said processor to control said physical movement and placement of said display inside and out of said aperture; and a processor housed inside said ear-mounted speaker audio system for generating images on said display, wherein said processor is configured for actuating said hollow, telescopic extension tubes which house a combination of wires connecting the display and electronic swivel to the processor in order to execute commands by:

receiving image inputs from a depth camera that detect a user's hand gestures which are waved in the air within a space in said depth camera's field of view;

receiving voice commands from a microphone that detects a user's speech; processing said depth camera and speech inputs in combination with inputs from other inertial measurement units, sensors, and transmitters to show images on said display based on said air wave hand gestures and speech patterns, determining at least one air wave hand gesture and speech pattern which instruct the motor to actuate the extraction and retraction mechanism of the telescoping extension tubes and electronic swivel;

said air wave hand gesture inputs which further include interacting with a multitude of holographic objects visible to said user via said display, said hand gesture interaction with holographic objects which are used by the processor to control navigation of the apparatus's features and further determine the movement of said display's extraction and retraction mechanism;

interconnected cameras, sensors, microphones, measurement units, speakers, circuit boards, and associated circuitry such that these parts act as a unit for receiving, from the user, an input associated with a function, the function used to approximate information presented on said display, as well as processing external physical objects, sensory, and auditory information that act as inputs for said apparatus's extraction and retraction mechanism; and said processor executed via wireless connections to satellites, other mobile devices, computers, a user's external environment, and any combination thereof.

2. The apparatus of claim 1, wherein said extraction and retraction mechanism includes an array of at least three hollow, telescoping extension tubes of at least 2 inches in substantially equal length and at least 0.07 inches in diameter meant to fully extend said display unto the user's field of view when said display is in use by the user and when not in use, fully retract said display and said attached swivel along with all said telescoping extension tubes back inside said apparatus's aperture, said telescoping extension tubes which are actuated by means of a drive cable of at least four inches in length, said drive cable including teeth that are turned by at least one gear.

3. An electronic apparatus for both extending and retracting a display within a user's field of view via an ear-mounted apparatus with at least one air wave hand gesture or speech command of a user, comprising:

a mostly transparent display;

an audio speaker ear mount configured to attach to either a single ear of a user or both ears:

a magnetic ear frame that encompasses the entire outer ear of said user with an attached earbud that fits inside said user's ear, providing additional support for the apparatus to remain secured in place, said magnetic ear frame which positions magnets around said ear's backside as well as the portion of said ear frame connecting to said apparatus thus creating a magnetic force field between said apparatus and said ear frame to maintain said apparatus levitated around said ear:

a fabric, said fabric which connects said magnetic ear frame to said apparatus and stretches from said apparatus to said ear frame and in doing so, encompasses the entire ear of said user from helix to earlobe, pressing said apparatus to cover said user's ear: an extraction and retraction mechanism that provides for said display to move to and from said user's field of vision wherein the shape of said apparatus is transformable from a first shape that has said display retracted and hidden from view to a second shape that has said display extended, whereby said user has two modes of operation for said apparatus: one mode conspicuous where said display is visible to said user and one mode inconspicuous where said display is not visible to said user:

an electronic swivel assembly of at least two revolving joint components that provide a hinge motion in order to rotate said display from a vertical position upon extrusion to a horizontal position once fully extended;

an array of hollow, telescopic extension tubes that provide the motion for extension and retraction of the attached swivel and display from inside said ear-mounted audio speaker;

said array of telescoping extension tubes which are actuated by applying an electric current to copper and other magnetic wire to create a solenoid base which houses said array of telescopic extension tubes each individual telescopic extension tube containing magnetic properties so that each tube becomes attracted within the magnetic field created by the tube that directly precedes it upon retraction in the order of closest to farthest from said solenoid mechanism;

said solenoid housing which includes a washer and a conical spring attached on one end to the washer and on the other end to the top of the smallest tube in said array of telescopic tubes in order to assist said extraction and retraction mechanism;

said array of telescopic extension tubes and said conical spring covered by a protective sleeve which also fits inside said apparatus when said telescopic tubes are retracted and said protective sleeve which also accompanies said telescopic extension tubes upon extrusion;

an aperture inside of said ear-mounted, audio speaker for housing said display, said swivel, said protective sleeve, and said telescopic extension tubes when retracted:

at least one microphone that interprets voice commands made by the user that are used by said processor to control said physical movement and placement of said display inside and out of said aperture; and a processor for providing image generation and for automatic control of said display's movement, wherein said automatic control of the display is characterized by non-physical touch on said apparatus, namely:

receiving image inputs from depth cameras and microphones;

processing said depth camera inputs and speech styles in combination with inputs from other sensors and transmitters to show images on said display for control of the solenoid base extraction and retraction mechanism.

4. A method for both extending and retracting a display inside and out of an electrical apparatus via a combination of shape shifting, programmable matter within an ear-mounted apparatus by utilizing a depth camera, microphone, and other sensors and transmitters the method comprising:

moving a display to and from said user's field of vision by means of said shape shifting programmable matter reassembling itself from an inconspicuous form into the shape of a conspicuous cylinder which extends from said apparatus to said display, wherein the shape of said apparatus transforms from a first shape that has said display retracted and hidden from view to a second shape that has said display extended by means of said cylinder shape, whereby said user has two modes of operation for said apparatus: one mode conspicuous where said display is visible to said user and one mode inconspicuous where said display is not visible to said user;

said programmable material functioning as an assembly of light-emitting diodes (LEDs) to produce different colors during the shape shifting process of said programmable material;

generating images on said display using a processor;

controlling the movement of said extraction and retraction mechanism by said processor receiving inputs from said depth camera and speech commands from a microphone in combination with inputs from the other sensors and transmitters to show images on said display, wherein the depth camera inputs include air wave hand gestures made by the user within a space in the field of view of the depth camera that are used by the processor to control said physical movement and placement of said display; and one or more electronic components which are contained inside said apparatus, said electronic components which carry both information and electric current to and from said display, as well as control and actuate said physical movement and placement of said display.

* * * * *